US 8,521,786 B2

(12) United States Patent
Black et al.

(10) Patent No.: US 8,521,786 B2
(45) Date of Patent: Aug. 27, 2013

(54) TECHNIQUES FOR ASSIGNING PROMOTIONS TO CONTACT ENTITIES

(75) Inventors: Andre B. Black, Medford, MA (US); Sudhakar Chalimadugu, Lowell, MA (US); David F. Cheung, Potomac, MD (US); Ruby Kennedy, Bedford, MA (US); Yuchun Lee, Sudbury, MA (US); Patrick Martin, Lexington, MA (US)

(73) Assignee: International Business Machines Corporation, Armonk, NY (US)

( * ) Notice: Subject to any disclaimer, the term of this patent is extended or adjusted under 35 U.S.C. 154(b) by 1777 days.

(21) Appl. No.: 11/491,622

(22) Filed: Jul. 24, 2006

(65) Prior Publication Data
US 2008/0021909 A1    Jan. 24, 2008

(51) Int. Cl.
G06F 7/00    (2006.01)

(52) U.S. Cl.
USPC ........................................................ 707/802

(58) Field of Classification Search
USPC .................. 707/100–102, 802, 805, 999.102; 705/10–14
See application file for complete search history.

(56) References Cited

U.S. PATENT DOCUMENTS

| | | | |
|---|---|---|---|
| 5,664,171 A | 9/1997 | Agrawal et al. |
| 5,765,154 A | 6/1998 | Horikiri et al. |
| 5,822,751 A | 10/1998 | Gray et al. |
| 5,883,940 A | 3/1999 | Thornton |
| 5,899,988 A | 5/1999 | Depledge et al. |
| 5,930,764 A | 7/1999 | Melchione et al. |
| 5,966,695 A | 10/1999 | Melchione et al. |
| 5,974,407 A | 10/1999 | Sacks |
| 6,061,658 A | 5/2000 | Chou et al. |
| 6,067,525 A | 5/2000 | Johnson et al. |
| 6,076,068 A | 6/2000 | DeLapa et al. |
| 6,078,892 A | 6/2000 | Anderson et al. |
| 6,097,792 A | 8/2000 | Thornton |
| 6,134,530 A | 10/2000 | Bunting et al. |
| 6,160,549 A | 12/2000 | Touma et al. |
| 6,161,103 A | 12/2000 | Rauer et al. |
| 6,263,334 B1 | 7/2001 | Fayyad et al. |
| 6,321,241 B1 | 11/2001 | Gartung et al. |
| 6,493,708 B1 | 12/2002 | Ziauddin et al. |
| 6,539,232 B2 | 3/2003 | Hendrey et al. |
| 6,567,786 B1 | 5/2003 | Bibelnieks et al. |
| 6,606,621 B2 | 8/2003 | Hopeman et al. |
| 6,684,207 B1 | 1/2004 | Greenfield et al. |
| 6,691,120 B1 | 2/2004 | Durrant et al. |
| 6,694,316 B1 | 2/2004 | Langseth et al. |

(Continued)

OTHER PUBLICATIONS

U.S. Appl. No. 09/575,283, filed May 22, 2000, Bergh et al.

(Continued)

*Primary Examiner* — Robert Beausoliel, Jr.
*Assistant Examiner* — Mohammed R Uddin
(74) *Attorney, Agent, or Firm* — Cuenot, Forsythe & Kim, LLC

(57) ABSTRACT

A computer implemented method for target group management is described. The method includes producing a table including one or more group entries corresponding to one or more defined contact group entities with each of the entries having a first set of group attributes, and producing a visual representation of a marketing campaign, the representation including one or more instances of defined contact group entities, with the one or more instances having a second set of group attributes and with the representation linked to the table according to the second set of group attributes.

34 Claims, 26 Drawing Sheets

(56) References Cited

U.S. PATENT DOCUMENTS

| | | |
|---|---|---|
| 6,782,390 B2 | 8/2004 | Lee et al. |
| 6,847,934 B1 | 1/2005 | Lin et al. |
| 6,868,389 B1 | 3/2005 | Wilkins et al. |
| 6,915,289 B1 | 7/2005 | Malloy et al. |
| 6,917,940 B1 | 7/2005 | Chen et al. |
| 6,959,305 B2 | 10/2005 | Bird et al. |
| 7,415,426 B2* | 8/2008 | Williams et al. ............. 705/14 |
| 2001/0014868 A1* | 8/2001 | Herz et al. ............. 705/14 |
| 2002/0026356 A1 | 2/2002 | Bergh et al. |
| 2002/0046116 A1 | 4/2002 | Hohle et al. |
| 2002/0169654 A1 | 11/2002 | Santos et al. |
| 2003/0009467 A1 | 1/2003 | Perrizo |
| 2003/0078787 A1* | 4/2003 | Hoffman et al. ............. 705/1 |
| 2003/0083924 A1* | 5/2003 | Lee et al. ............. 705/10 |
| 2003/0110119 A1 | 6/2003 | Crites |
| 2003/0115207 A1 | 6/2003 | Bowman et al. |
| 2003/0130883 A1 | 7/2003 | Schroeder et al. |
| 2003/0135442 A1 | 7/2003 | Kumar et al. |
| 2003/0144873 A1 | 7/2003 | Keshel |
| 2003/0187767 A1 | 10/2003 | Crites et al. |
| 2003/0208402 A1* | 11/2003 | Bibelnieks et al. ............. 705/14 |
| 2004/0133487 A1 | 7/2004 | Hanagan et al. |
| 2004/0254860 A1 | 12/2004 | Wagner et al. |
| 2005/0075926 A1* | 4/2005 | Liu et al. ............. 705/14 |
| 2005/0197899 A1* | 9/2005 | Veit et al. ............. 705/14 |
| 2005/0216525 A1* | 9/2005 | Wachholz-Prill et al. .... 707/201 |
| 2005/0273380 A1* | 12/2005 | Schroeder et al. ............. 705/10 |
| 2005/0289000 A1 | 12/2005 | Chiang et al. |
| 2006/0015405 A1* | 1/2006 | Bala et al. ............. 705/14 |
| 2006/0047571 A1* | 3/2006 | Garcia et al. ............. 705/14 |
| 2006/0059033 A1* | 3/2006 | Wagner et al. ............. 705/10 |
| 2006/0085246 A1 | 4/2006 | Li |
| 2006/0095321 A1 | 5/2006 | Shi et al. |
| 2006/0167904 A1* | 7/2006 | Mitchell et al. ............. 707/100 |
| 2007/0050246 A1* | 3/2007 | Talavera ............. 705/14 |
| 2007/0100693 A1* | 5/2007 | Milman et al. ............. 705/14 |
| 2007/0150334 A1 | 6/2007 | Bergh et al. |
| 2007/0239521 A1* | 10/2007 | Khadpe et al. ............. 705/14 |
| 2008/0027788 A1* | 1/2008 | Lawrence et al. ............. 705/10 |
| 2008/0033784 A1 | 2/2008 | Chalimadugu et al. |
| 2008/0033807 A1 | 2/2008 | Black et al. |
| 2008/0033808 A1 | 2/2008 | Black et al. |
| 2008/0033809 A1 | 2/2008 | Black et al. |
| 2008/0126146 A1 | 5/2008 | Benveniste et al. |
| 2008/0162693 A1* | 7/2008 | Kanojia et al. ............. 709/224 |

OTHER PUBLICATIONS

Griggs. "Give us leads! Give us leads!" Sales and Marketing Management. New York 149(7):66, 1997 (from Proquest).

McGinnis et al., "Strategic account management in the new procurement environment", Supply Chain Management. Bradford 3(1):12, 1998 (from Proquest).

"General Interactive Teams up with IBM to Deliver Industries Best E-Business and Relationship Marketing Solutions". Business/Technology Editors, Business Wire, New York. May 3, 1999 (from Proquest).

"Microsoft Announces Internet Lead Management Platform", from www.microsoft.com, Jan. 24, 2000.

"Data Mining Solutions and Customer Management", Bill Bradway, Meridien Research, Inc., Dec. 1997.

Godwin. "Predictor of Households' Debt Repayment Difficulties", Association for Financial Counseling and Planning Education, pp. 67-78, © 1999.

Boyes et al., "Lender Reactions to Information Restrictions: The Case of Banks and the ECOA", Journal of Money, Credit and Banking 18(2):211-219, 1986.

Chou et al., "Identifying Prospective Customers", © ACM, pp. 447-456, 2000.

Hernandez-Sherrington et al., "A Generalization of Band Joins and the Merge/Purge Problem", © Columbia University, Ph.D. Thesis, pp. i-171, 1996.

Raab. "Unica Impact!" DM News, Sep. 1999, retrieved from the Internet at URL: <http://vvww.raabassociates.com/a909unic.htm>.

"Leading Customer-Focused Corporations Join Unica TM Advisory Board", BusinessWire, pp. 1-2, Nov. 6, 2000.

"Lands' End to Automate Marketing Processes with Unica Corporation's Affinium", BusinessWire pp. 1-2, Sep. 12, 2000.

"Product Review 'Affinium Campaign'—Affinium Campaign Enables MITI to Create Complex Campaigns Across Diverse Databases", DM Review, pp. 1, May 2000.

"Workflow and Internet: Catalysts for Radical Change", Workflow Management Coalition, Jun. 1998, pp. 1-32.

* cited by examiner

Customer Offers

| | Offer 5 |
|---|---|
| Offer name | Favorite Destinations |
| Offer code | XYZ-789 |
| Description | Specials on favorite dest. |
| Contact channel | Email |
| Expiration date | 7/30/2005 |
| From: (departure) | <FavoriteTrips.From> |
| To: (destination) | <FavoriteTrips.To> |
| Fare | <FavoriteTrips.Fare> |

160

FavoriteTrips

| CID | From | To | Date |
|---|---|---|---|
| 3254678 | Boston | New York | 99 |
| 3254678 | Boston | Orlando | 86 |
| 3254678 | New York | London | 75 |
| 8452353 | Atlanta | Chicago | 87 |
| 8452353 | Atlanta | Los Angeles | 81 |
| 8452353 | Atlanta | San Diego | 78 |
| 8452353 | Atlanta | Boston | 75 |
| 1547653 | Chicago | Dallas | 93 |
| ... | ... | ... | ... |

All Campaigns > NorthEast Region > 222

Migration Campaign *Cell Attributes* | Edit... ▼ | Mode ▼

| Target Cell Code | Target Cell Name | Control Cell Code | Assigned Offer(s) | Used in Flowchart | Comments |
|---|---|---|---|---|---|
| T01-HVHR | HiVal_HiRisk | | Low APR with bal transfer (APR456H); NewsletterTabularOffers (STRAG03GH); SendToAFriend_FreeShipping (SILMA000AH) | Multi-channel | |
| T01-HVMR | HiVal_MedRisk | | Low APR with bal transfer (APR456H) | Multi-channel | |
| T01-HVLR | HiVal_LoRisk | | Low APR with bal transfer (APR456H) | Multi-channel | |
| T02-MVHR | MedVal_HiRisk | | Low APR with bal transfer (APR456H) | Multi-channel | |
| T02-MVMR | MedVal_MedRisk | | Low APR with bal transfer (APR456H) | Multi-channel | |
| T02-MVLR | MedVal_LoRisk | | Low APR with bal transfer (APR456H) | Multi-channel | |
| T03-LVHR | LoVal_HiRisk | | Low APR with bal transfer (APR456H) | Multi-channel | |
| T03-LVMR | LoVal_MedRisk | | Low APR with bal transfer (APR456H) | Multi-channel | |
| T03-LVLR | LoVal_LoRisk | | Low APR with bal transfer (APR456H) | Multi-channel | |
| T04-LVMR | LoVal_MedRisk | | Low APR with bal transfer (APR456H) | | |
| T04-LVLR | LoVal_LoRisk | | Low APR with bal transfer (APR456H) | | |
| T05-LVLR | LoVal_LoRisk | | Low APR with bal transfer (APR456H) | Multi-channel | |

All Campaigns > NorthEast Region > 220

Migration Campaign *Multi-channel* | Edit... ▼ | Run... ▼

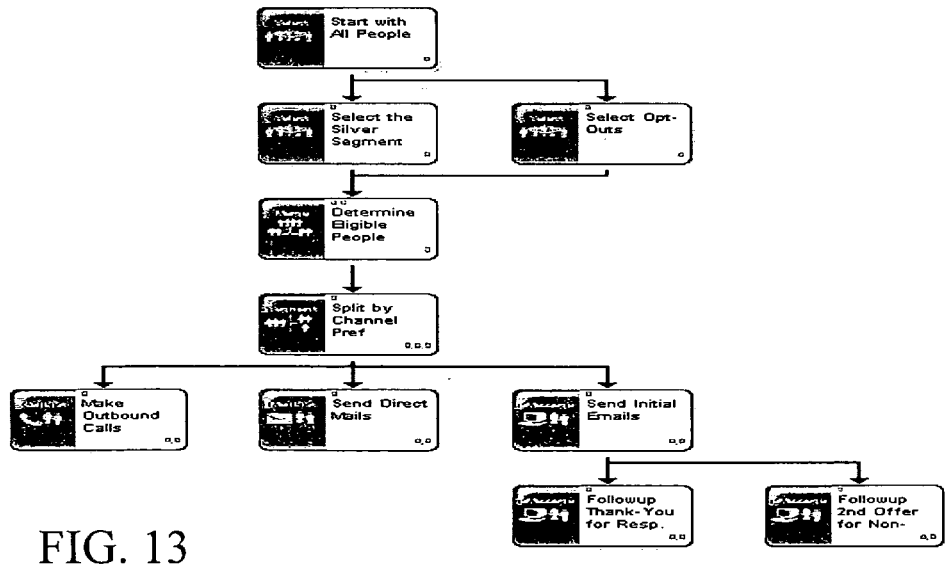

TECHNIQUES FOR ASSIGNING PROMOTIONS TO CONTACT ENTITIES

BACKGROUND

Promotions are specific communications made from one entity to another entity. The challenges in managing promotions can arise out of the various situations in which promotions are used. For example, marketers in the financial services, travel and retail industries may each have specialized considerations when communicating with potential or existing customers. Each industry may have different types of promotions directed to communicate different types of products or services, resulting in an infinite variety of possible attributes. All marketers produce a potentially large variety of promotions and assign them to a potentially large variety of contacts. These promotions are logged and tracked for future analysis to improve the promotions.

SUMMARY

According to an aspect of the present invention, a computer implemented method for target group management includes producing a table including one or more group entries corresponding to one or more defined contact group entities with each of the entries having a first set of group attributes, and producing a visual representation of a marketing campaign, the representation including one or more instances of defined contact group entities, with the one or more instances having a second set of group attributes and with the representation linked to the table according to the second set of group attributes.

Implementations can include one or more of the following. The second set of group attributes correspond to the first set of group attributes, and with the table and the flowchart representing promotions assigned to contact group entities in a marketing campaign. The one or more first group attributes include a group name and a group code corresponding to a group of contact entities. The one or more first group attributes include one or more group-level custom attributes, the one or more group-level custom attributes corresponding to metadata associated with the group. The group code is a first group code and each of the one or more flowchart instances include a second group code corresponding to a first group code of one or more group spreadsheet records. The table is a spreadsheet and the visual representation is flowchart. Updating the one or more first group attributes of one or more of the group spreadsheet records, and mirroring the updating in the one or more second group attributes of the one or more flowchart instances corresponding to the one or more first group attributes of the one or more group spreadsheet records. Updating the one or more second group attributes of one or more of the flowchart instances, and mirroring the updating in the one or more first group attributes of the one or more group spreadsheet records corresponding to the one or more second group attributes of the one or more flowchart instances. Producing the group spreadsheet includes linking one or more group spreadsheet records with one or more flowchart instances, and populating the first group attributes of the one or more group spreadsheet records from the second group attributes of the one or more flowchart instances. Producing the campaign flowchart includes linking one or more flowchart instances with one or more group spreadsheet records, and populating the second group attributes of the one or more flowchart instances from the first group attributes of the one or more group spreadsheet records. The promotion instance includes parameterized attributes and the method further includes using the first group attributes for data-driven personalization of the parameterized attributes. The one or more first group attributes include a control group name corresponding to a control group assigned to the group, and a promotion instance name corresponding to a promotion instance assigned to the group. Using the first group attributes to define the one or more instances.

DESCRIPTION OF DRAWINGS

FIG. 10 is a diagram depicting data-driven parameterization of promotions.

FIG. 13 is a diagram depicting a target group spreadsheet and a campaign flowchart.

FIG. 19 is a diagram depicting a query in a dynamic promotion list.

DETAILED DESCRIPTION

Figure 1:
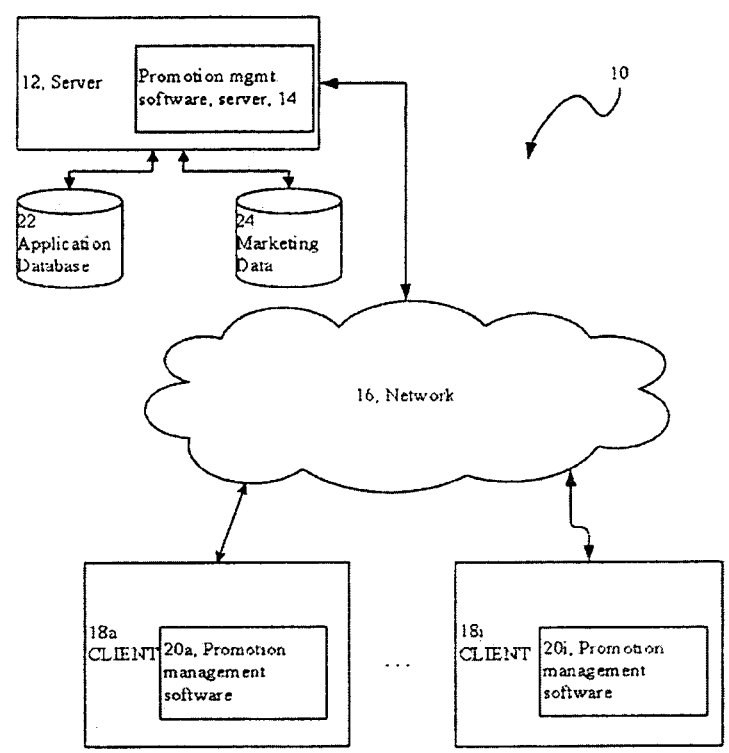
FIG. 1 is a block diagram of a computer system executing promotion management software.

Referring to FIG. 1, a network computer system 10 includes a server 12 executing software for promotion management 14, connected through a network 16, to clients 18*a* to 18*i* executing respective client instances 20*a* to 20*i* of promotion management software 14. As used herein, the terms "promotion(s)" and "offer(s)" are used interchangeably, but are limited to refer to specific marketing communications that are typically provided in a marketing campaign. Although the network computer system 10 is shown including the server 12 running promotion management software server process 14 and client systems 18*a* to 18*i* running the client promotion management software 20*a* to 20*i*, it is understood that the server software 14 and the client promotion management software 20*a* to 20*i* can run on the same machines, e.g., the server 12. The client systems are used to interface with promotion management software instances 20*a* to 20*i* to produce and manage promotions. The server 12 is connected to an application database 22 that stores information required by the promotion management software 14 to operate (e.g., system table data) and a marketing database 24 that stores the company marketing (e.g., customer or prospect) and related data and can be used to drive marketing campaigns. The application and marketing databases 22 and 24 may run on the same machine as server 12 or different machines. Databases 22 and 24 may be in different databases, on different machines, or they may be separate schemas in the same database on the same machine. The clients 18a-18i are connected to the server 12 by the network 16.

Figure 2:
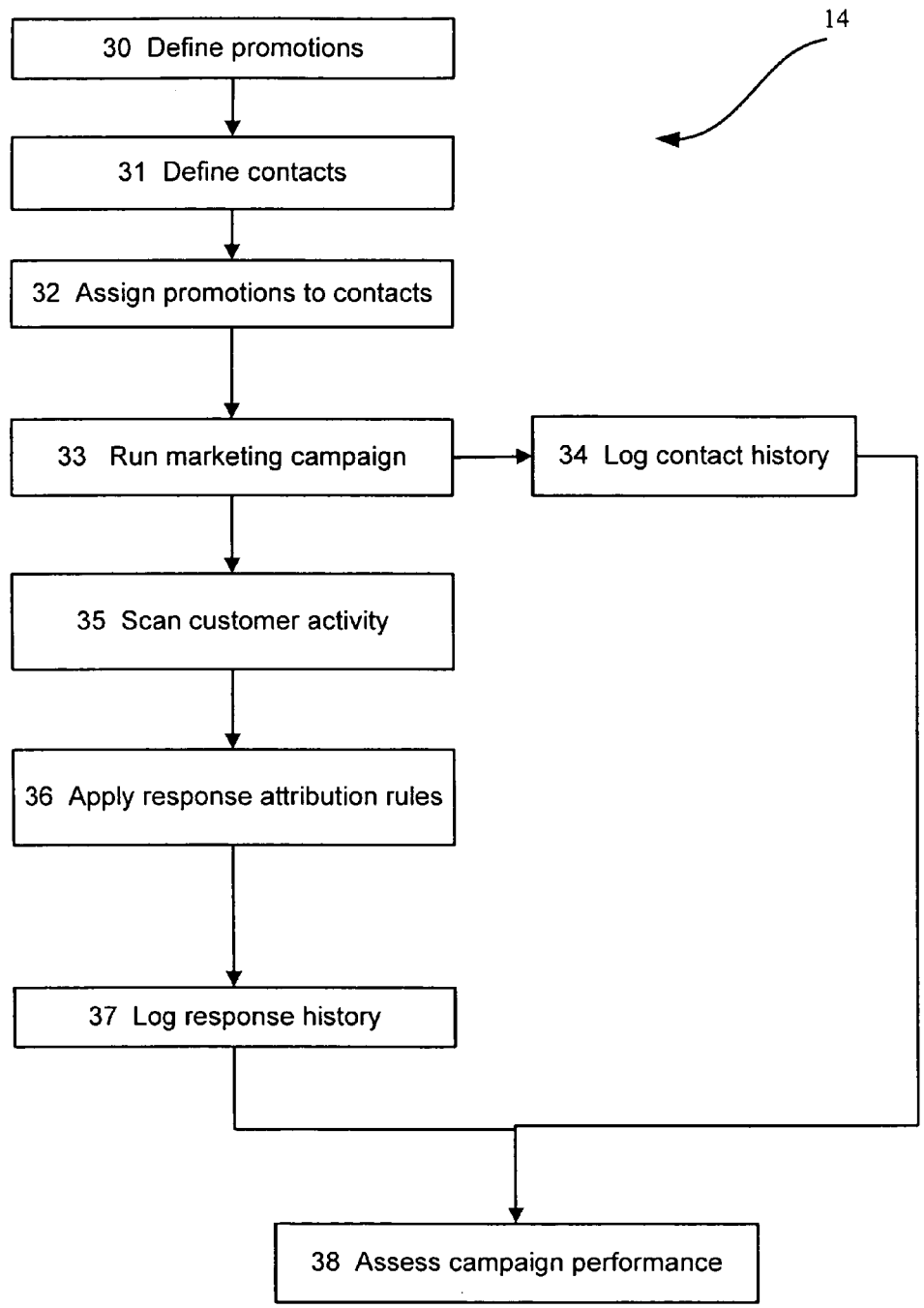
FIG. 2 is a flowchart depicting the promotion management lifecycle.

Referring to FIG. 2, promotion management software 14 is shown. A user defines one or more promotions 30 that the user wishes to use in a marketing campaign. The user defines the contacts 31, which can be persons or entities (e.g., households, businesses, accounts of individuals), or both, for the marketing campaign. The promotions are assigned to the contacts 32. The promotion management software 14 (from FIG. 1) runs the marketing campaign 33. The promotion management software 14 logs the contact history of the marketing campaign 34, to maintain a record of which contacts received what promotions. Logging of the contact history 34 also facilitates assessing the campaign's performance, as discussed below.

After the promotion management software 14 runs the marketing campaign 33, the software scans relevant customer activity 35 and applies response attribution rules 36 to the customer activity. The response attribution rules, as will be discussed in detail below, determine which promotions receive credit for customer activity. The promotion management software 14 logs the response history 37. The logged contact history 34 and logged response history 37 data are used to assess the marketing campaign's performance 38.

Figure 3:
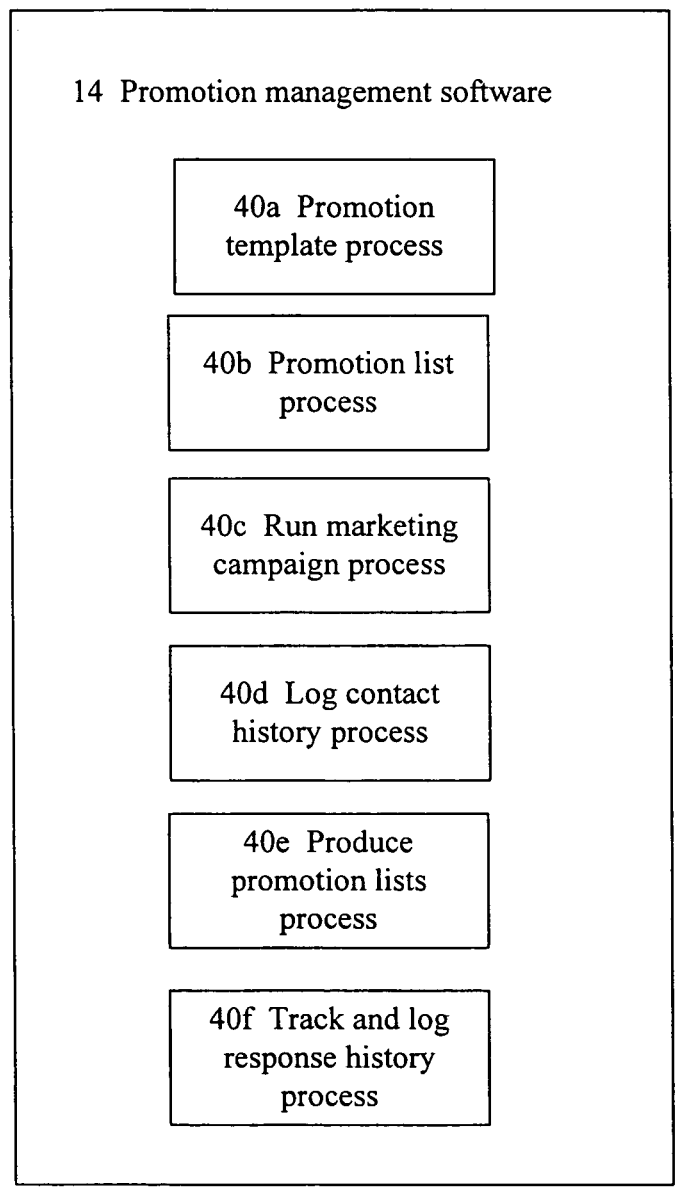
FIG. 3 is a block diagram of the promotion management software.

Referring to FIG. 3, the promotion management software instances 20a to 20i (in FIG. 1) include software processes 40a to 40f such as, for example, processes that produce promotion templates, promotion lists, and processes that manage contact histories and target groups. As used herein, groups refer to collections of contacts, typically individuals or other entities, whereas target groups refer to groups of entities that are intended recipients for specific marketing communications, e.g., promotions, and control groups refer to groups of entities that are typically randomly sampled from the target groups and withheld from receiving the marketing communications to evaluate the effectiveness of the marketing communications, as will be further discussed below. Control groups are used by marketers for comparison purposes against the target group. This can be a hold-out control group which receives no communication, or it may be a test/challenger group compared to a base/champion group where the test/challenger group receives an alternate "test" promotion. This is also known in marketing as A/B splits. When control groups are used for champion/challenger comparisons, there can be many challenger groups associated with the champion group. In either the hold-out control group or the champion/challenger scenario ("test group scenario"), one or more comparisons are made between promotions assigned to the control group vs. the target group.

Process 40a produces promotion templates and promotion instances. Process 40b manages the design of a marketing campaign and assignment of promotion instances to groups of contact entities. Process 40c executes the marketing campaign. Process 40d manages the contacts of a marketing campaign and logs the history of the promotions made to groups of contacts, including members of control groups. Process 40e produces contact lists (not including control groups) for the promotions that aid the user in managing and optimizing the marketing campaign. Process 40f logs and tracks the responses from contact entities and controls.

Figure 4:
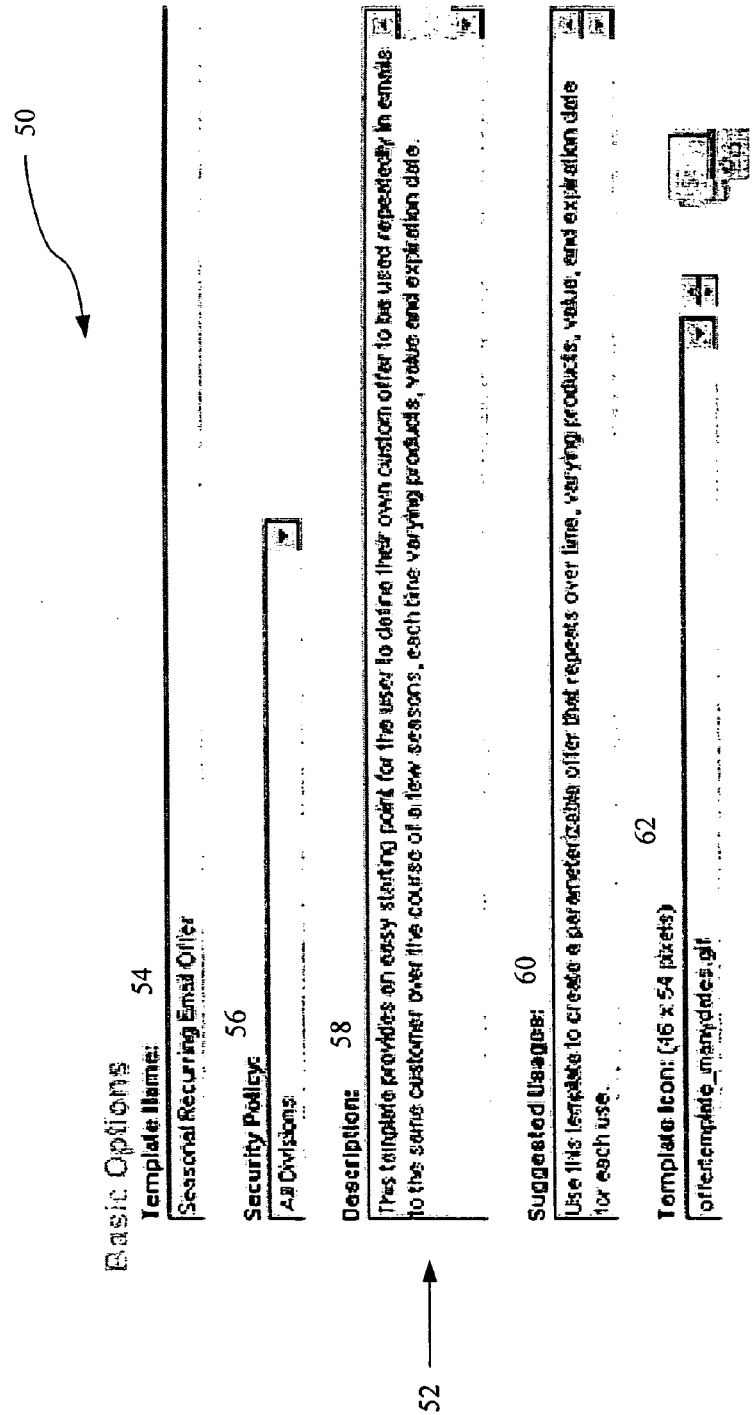
FIGS. 4 and 5 are diagrams depicting a promotion template.
Figure 5:
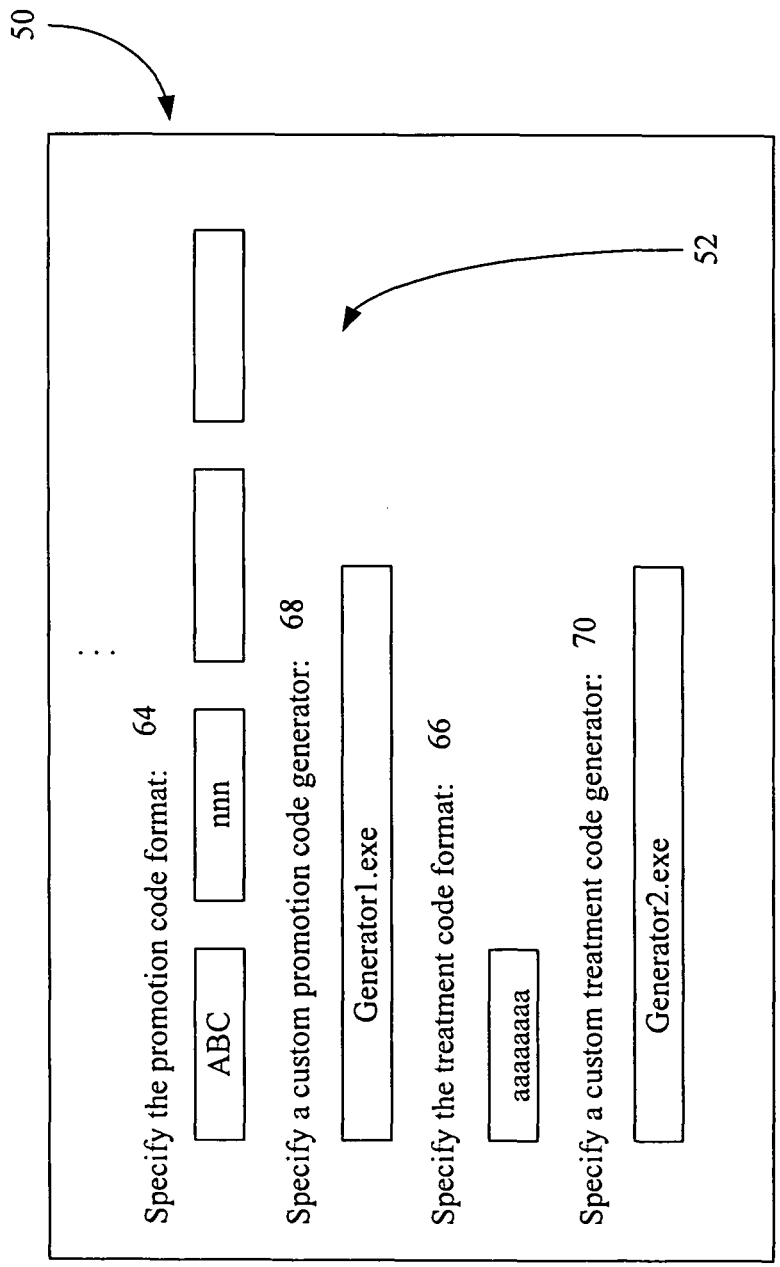

Referring now to FIGS. 4 and 5, process 40a included in the promotion management software produces a promotion template 50 that includes a set of fields that are "basic options" 52. The basic options attribute fields 52 are pre-assigned by the process 40a to define a promotion to the promotion management software. Values of the basic options attribute fields 52 are assigned to the promotion template 50 by the user (typically an application administrator). Each time the user produces a promotion template 50, the user chooses and populates attribute fields for basic options 52.

The basic options include a template name field 54, a security policy field 56, a description field 58, suggested usages fields 60, and an icon 62. Other basic option fields can be defined and included by the promotions management software 14. The promotion template 50 is stored in a folder in the promotion management software on a computer hard drive of the client or the database for future access by that user or other users, as may be determined by the applicable security policy 56. The process 40a allows the user to produce and store one or more promotion templates 50. From the promotion template 50, other promotion templates can be produced, as well as promotion instances or promotion versions, as discussed below. The security policy 56 determines which users have permission to access the promotion template 50 and what functions the users are allowed to perform with the template (e.g., edit or retire). Security policies govern which users can access which objects (e.g., promotion templates or promotion instances) and the functions those users can perform on those objects (security policies may be applied per object instance or inherited from a parent object or folder) to control access and/or enforce process. The description 58 and suggested uses 60 fields provide further information about the template to aid the user using these templates to produce promotion instances. The icon 62 can be used to help visually identify the promotion template 50. The basic options 52 of the promotion template also can include a promotion code format 64 and a treatment code format 66. The promotion code format 64 and treatment code format 66 are user-specified and each is generated by a code generator customized for a particular system/implementation. The custom code generator includes a custom promotion code generator 68, e.g., "generator1.exe," and a custom treatment code generator 70, e.g., "generator2.exe." When the user produces a promotion instance, the promotion code generator 68 generates a unique promotion code to identify the promotion instance, e.g., "ABC-123" based on the promotion code format 64, e.g., "ABC-nnn."

Figure 6:
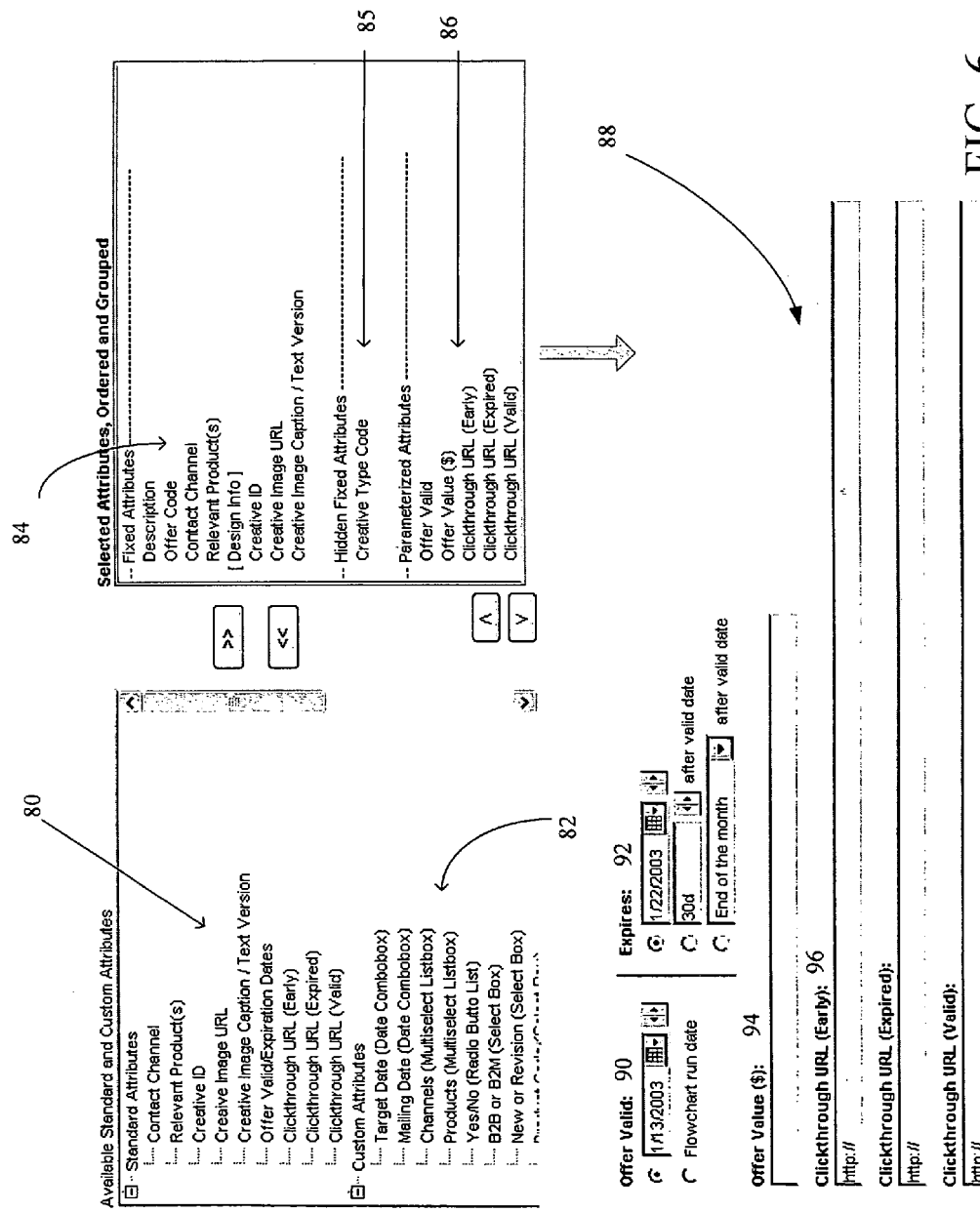
FIG. 6 is a diagram depicting standard attributes and custom attributes of a promotion template.

Referring now to FIG. 6, standard attributes 80 and custom attributes 82 are assigned to the promotion template. A set of standard attributes 80 are included with the promotion management software. These standard attributes 80 are attributes that would be commonly used when producing a promotion template. Examples of commonly used basic options included in the promotion template include a contact channel, a promotion expiration date, and relevant products (used for inferred responses for a promotion). Relevant products can be a list or a query executed against a product table using any attributes within the product table to return a list of unique ProductIDs which can be used to evaluate if the recipient (or member of a hold-out control group) performed the desired action (e.g., purchasing product X).

Custom attributes 82 are user-defined options which can be added to the promotion template. Custom attributes can be of various data types, including string, numeric, date/time, or currency. In addition, each custom attribute can allow free-form entry by the user, provide a fixed drop-down list of values from which the user can select, or provide a drop-down list of values and allow the user to enter additional value(s) which then are subsequently available to all users (modifiable drop-down list). The drop-down list initial values can be entered by the administrative user when producing the custom attribute or dynamically queried from a database table or flat file.

In addition to the above, a special custom attribute field can contain multiple values. The multiple values may be manually entered (e.g., multiple string values separated by commas), selected from a fixed list, selected and/or added in a modifiable list, or specified as a query against one or more fields/tables in a database or a flat file. The "related products" field is an example of this type of field where the user specifies a query, typically against a "product table" returning a list of product identifiers (e.g., all stock keeping units where manufacturer="Fisher-Price" ™) for products related to the promotion instance. Another example is a multi-valued response channel field, where the consumer must use one of the listed channel(s) when purchasing to qualify as a responder (e.g., purchase is web-based or faxed in). These multiple value fields become important in response tracking attribution (described later).

Standard attributes 80 and custom attributes 82 can either be static (fixed) attributes 84, static hidden 85, or parameterized attributes 86. Static attributes are assigned fixed values when a promotion instance is produced. Parameterized attributes are assigned default values when a promotion instance is produced, but when the promotion instance is assigned to a group in a marketing campaign, its value can be changed. Multiple promotion versions can exist if the promotion instance was produced from a promotion template including at least one parameterized attribute 86. Each permutation of parameterized attributes for a promotion instance produces a separate promotion version. The promotion attributes can be hashed to determine when a unique permutation exists requiring the production of a new promotion version, where unique instances are stored across campaigns thus reduces storage and computation overhead associated with a normalized history. It is possible to produce multiple promotion versions with the same set of parameterized attributes to optimize run time execution, since promotion versions can still be grouped by their promotion attributes during reporting. A promotion instance produced from a promotion template that does not include any parameterized attributes 86 can have at most one promotion version, that is produced when a campaign is executed, assigning that promotion instance to one or more groups. Control over which attributes are static or parameterized provides a marketing organization control over when new promotion instances are produced versus when promotion versions can be used by controlling which attributes are parameterized. This control provides flexibility in determining how promotions are measured and analyzed for their effectiveness.

Static attributes 84 are constant for the promotion versions produced from the same promotion instance. For example, if a "Fixed-rate home mortgage" promotion template is produced with a static attribute of "closing points," promotion instance A could be produced with two closing points and promotion instance B could be produced with zero closing points. All promotion versions A1, A2, A3 . . . produced from promotion instance A (by varying other parameterized attributes associated with promotion instance A) would have two closing points. All promotion versions B1, B2, B3 . . . produced from promotion instance B would have zero closing points. The promotion template can specify a default value for the static promotion attribute that can be overridden by the user when the promotion template is used to produce a promotion instance.

Parameterized attributes 86, on the other hand, may vary in value, producing different promotion versions for each combination of values. Again, the promotion template can specify a default value for each parameterized attribute that can be overridden by the user when the promotion template is used to produce a promotion instance. The values specified in the promotion instance for the parameterized attributes 86, however, are default values that can be changed by the user when the promotion instance is used (i.e., assigned to a group in a marketing campaign).

The static attributes 84 and parameterized attributes 86 can be ordered to control the order in which they are displayed to the user. The standard attributes 80 and custom attributes 82 can be hidden such that when the user produces a promotion instance or promotion version from the promotion template, the hidden attributes 85 of the promotion instance or promotion version cannot be seen by the user or are read-only (displays the attribute name/value, but does not allow user editing). The user can specify default values 88 for the static attributes 84, hidden attributes 85 and parameterized attributes 86 of the promotion template.

As shown in FIG. 6, examples of default values 88 include "a promotion valid from date" 90, which can be user-defined or based on the execution of a campaign (that may be implemented as a "flowchart") separate from the promotion management software 14. The default values 88 can also be a "promotion expiration date" 92 that is either user-defined absolute dates, or set to expire after a certain period from "the promotion valid from date" 90, which could be the campaign execution date (e.g., process box run date within the flowchart executing the campaign). Default values 88 can also be promotion value 94 corresponding to a monetary amount, or click-through uniform resource locators (URLs) 96 corresponding to web-based promotions. Any standard attributes 80 or custom attributes 82 that are used in a promotion template as static 84 or parameterized attributes 86 may have default values 88 (hidden attributes 85 are required to have default values 88). Thus, when the user uses the promotion template to produce a promotion instance, the process 40a populates the static attributes 84 or parameterized attributes 86 with the default values 88.

Figure 7:
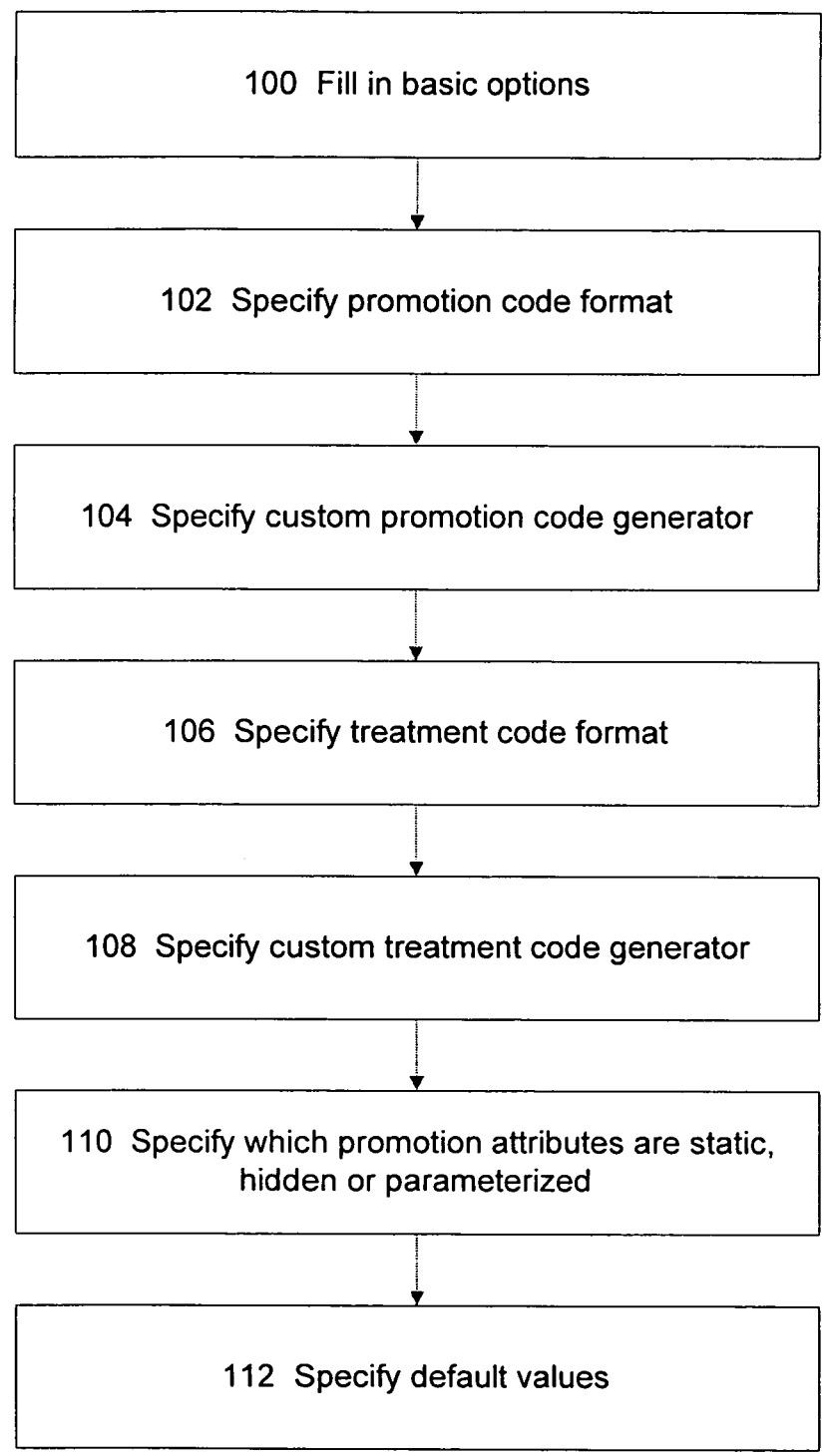
FIG. 7 is a flowchart for producing a promotion template.

Referring to FIG. 7, process 40a producing a promotion template includes a user filling in basic options 100, and specifying the promotion code format 102. The user specifies a custom promotion code generator 104. Thereafter, as discussed in detail below, the user specifies a treatment code format 106. The treatment code format is used to uniquely identify the treatment instance, which is used in contact history and response tracking. The user specifies a custom treatment code generator 108, which is used in a similar manner as the promotion code generator 104. The user chooses which standard attributes 80 and custom attributes 82 to include in the promotion template and specifies which promotion attributes are static, hidden, or parameterized 110 and specifies the default values 112.

Figure 8:
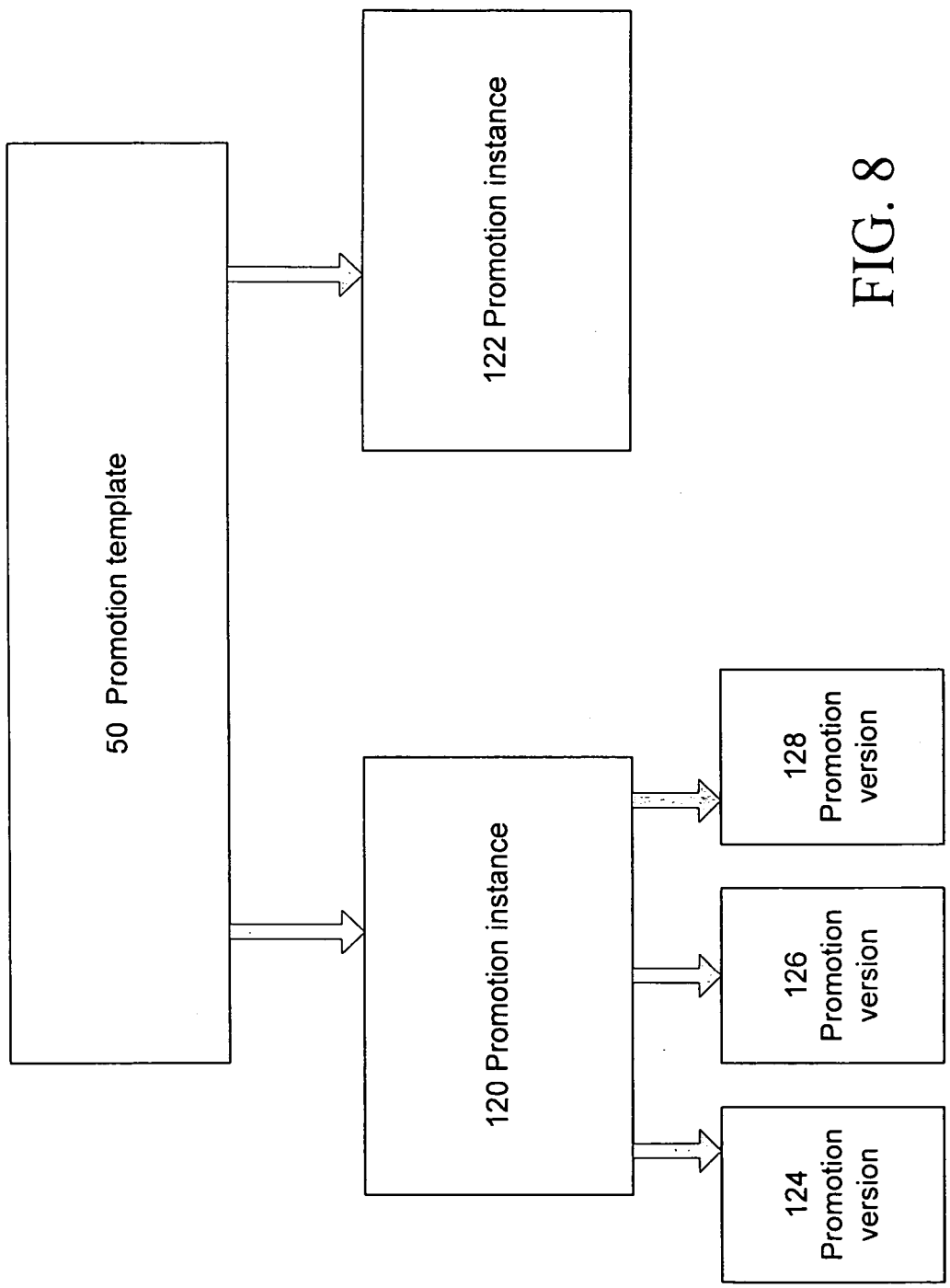
FIGS. 8 and 9 are diagrams depicting promotion instances and promotion versions.

Referring now to FIG. 8, the promotion template 50 is used to produce promotion instances 120, 122 and promotion versions 124, 126, 128. The user modifies the default values of the static attributes in the promotion template 50 to produce promotion instances 120, 122. When the user assigns a promotion instance 120 to a group of contact entities, the user specifies different sets of values for the parameterized attributes in the promotion instance 120 to produce promotion versions 124, 126, 128. The group of contact entities can either be target groups of contacts receiving promotions, or control groups of contacts to test promotion effectiveness. Assigning promotions to groups is generally performed within a contact-style process box (not shown) of the software. A contact-style process box facilitates assigning promotions to groups over specific contact channels in an execution of a marketing campaign. Contact channels include direct mail, contact centers, branches/stores, or email. For the user's convenience, multiple promotions can be assigned to multiple groups within a single contact-style process box, designating a contact channel. Contact-style process boxes are discussed in further detail below with regard to contact history.

The user produces promotion instances 120, 122 when the user changes the value of one or more static or parameterized attributes. These are treated as separate promotion instances in the promotion management software. Promotion instances 120, 122 have different promotion codes to distinguish one promotion instance from another, even though the promotion instances may have the same name and/or attribute values.

The user produces promotion versions 124, 126, 128 when the user changes the value of one or more parameterized attributes, as defined in the promotion template 50. The promotion versions 124, 126, 128 have the same static attribute values and the same promotion code. The promotion management system treats promotion versions 124, 126, 128 as permutations of a common promotion instance, for example, promotion instance 120. The feature of parameterized attributes allows a user to conveniently produce a plurality of promotion versions having the same values for static attributes (including basic options).

Figure 9:
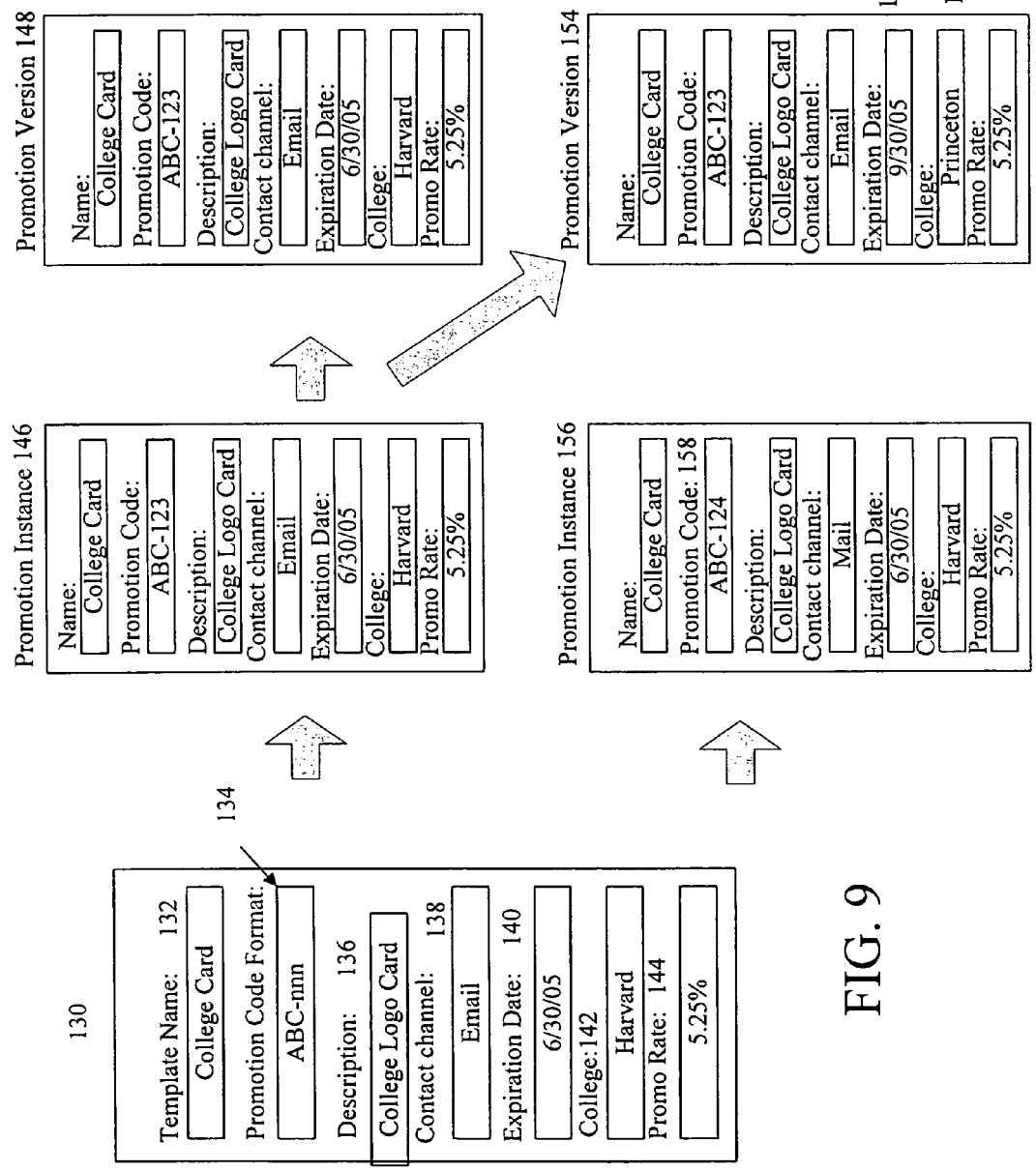

Referring to FIG. 9, to illustrate the above features, promotion template 130 is shown having basic options of a promotion template name 132 of value "College Card," and a promotion code format 134 of value "ABC-nnn." The promotion template 130 also has standard attributes, which are a static attributes, namely a description 136 of value "College Logo Card" and contact channel 138 of value "Email." There is also a standard attribute which is a parameterized attribute, namely, expiration date 140 of default value "Jun. 30, 2005." Promotion template 130 also has custom attributes which are parameterized attributes, namely, college 142 of default value "Harvard," and promo rate 144 of default value "5.25%."

The user produces promotion instance 146 from the promotion template 130 using all of the default values. Based on the promotion code format 134, the promotion code generator generates the unique promotion code "ABC-123." The user assigns promotion instance 146 to a group of Harvard graduates, producing a promotion version 148 with the same values as the promotion instance 146. The user assigns promotion instance 146 to a group of Princeton graduates, but changes the default values of parameterized attributes expiration date 140 and college 142 to produce promotion version 154. Specifically, when the user produces promotion version 154, expiration date 140 of default value "Jun. 30, 2005" is changed to value "Sep. 30, 2005," and college 142 of default value "Harvard" is changed to value "Princeton." New values "Sep. 30, 2005" and "Princeton" are assigned to expiration date 150 and college 152 of promotion version 154, respectively. The other static attributes of promotion version 154 remain the same as the corresponding attributes in promotion instance 146. Both promotion versions 148, 154 have the same promotion code of value "ABC-123." Thus, promotion versions 148, 154 are permutations of a promotion instance 146.

The user can re-use the promotion template 130 to produce a promotion instance 156 with different attribute values. Here, the user has changed the value of static attribute "contact channel" 138 from "Email" to a new value "Mail." Values of all other attributes remain unchanged. When the user produces the promotion instance 156, the promotion management software treats promotion instance 156 as a separate promotion instance from the promotion instance 146. There is a unique promotion code 158 of value "ABC-124" for promotion instance 156.

Promotion templates can be used to produce new promotion instances when the promotion template is "active." A promotion template, once it has been used to produce one or more promotion instances, can be "retired" (but not deleted). Retired promotion templates can no longer be used to produce additional promotion instances, but are still available for reporting and system table integrity.

Referring to FIG. 10, while the user can manually populate the values of the parameterized attributes with a constant value, as discussed above, the values of the parameterized attributes 160 can also be populated from a database or list, e.g., database 24 (FIG. 1) or by computing values based on data from a database (i.e., calculated fields). Populating the values from data may be desirable to support a large number of promotions versions to be assigned to target groups. "Data-driven" parameterized attribute fields 162 are, e.g., "FavoriteTrips.From" and "FavoriteTrips.To" and correspond with the "From" and "To" columns of the "driving table" (Favorite Trips) in the database. The data in the driving table is matched to the target entities by a code (e.g., Customer ID) and each row of the driving table corresponds to one promotion version given to the target recipient. Thus, by mapping the data to the data-driven parameterized attribute fields, the promotion management software 14 can automatically produce, at run time of a campaign flowchart, the promotion versions needed, without the user manually producing promotion versions, as discussed above.

Since any target entity can have a variable number of rows associated with it in the driving table, data-driven parameterization provides truly data-driven personalization of promotions. For example, customer #3254678 is offered three different flight promotions (Boston to New York, Boston to Orlando, and New York to London) while customer #8452353 is offered four flight promotions (Atlanta to Chicago, Atlanta to Los Angeles, Atlanta to San Diego, and Atlanta to Boston). This solution provides tremendous scalability in one-to-one promotion personalization, while retaining full granularity of promotion information for tracking purposes (to be discussed below).

Custom validation of standard and custom attributes of promotion instances and promotion versions can be implemented to ensure that the combination of values chosen for a particular promotion instance or version meets the requirements of the company. These validation checks could verify numeric/date/currency ranges, compare attribute values, enforce specific dependencies between multiple fields, provide security (which user is allowed to make certain types of changes).

Figure 11:
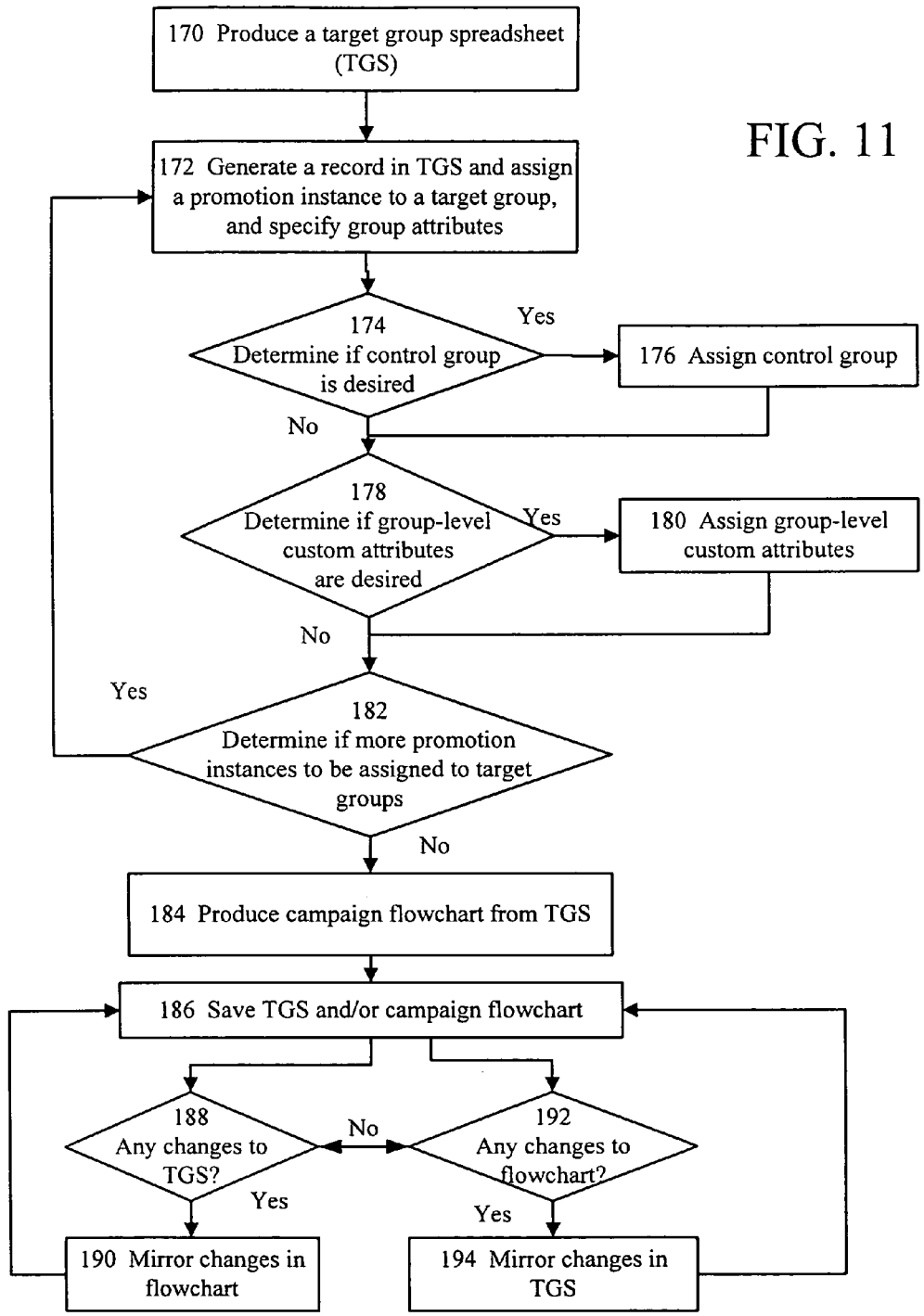
FIGS. 11, 11A, and 12 are flowcharts depicting the target group management process.
Figure 12:
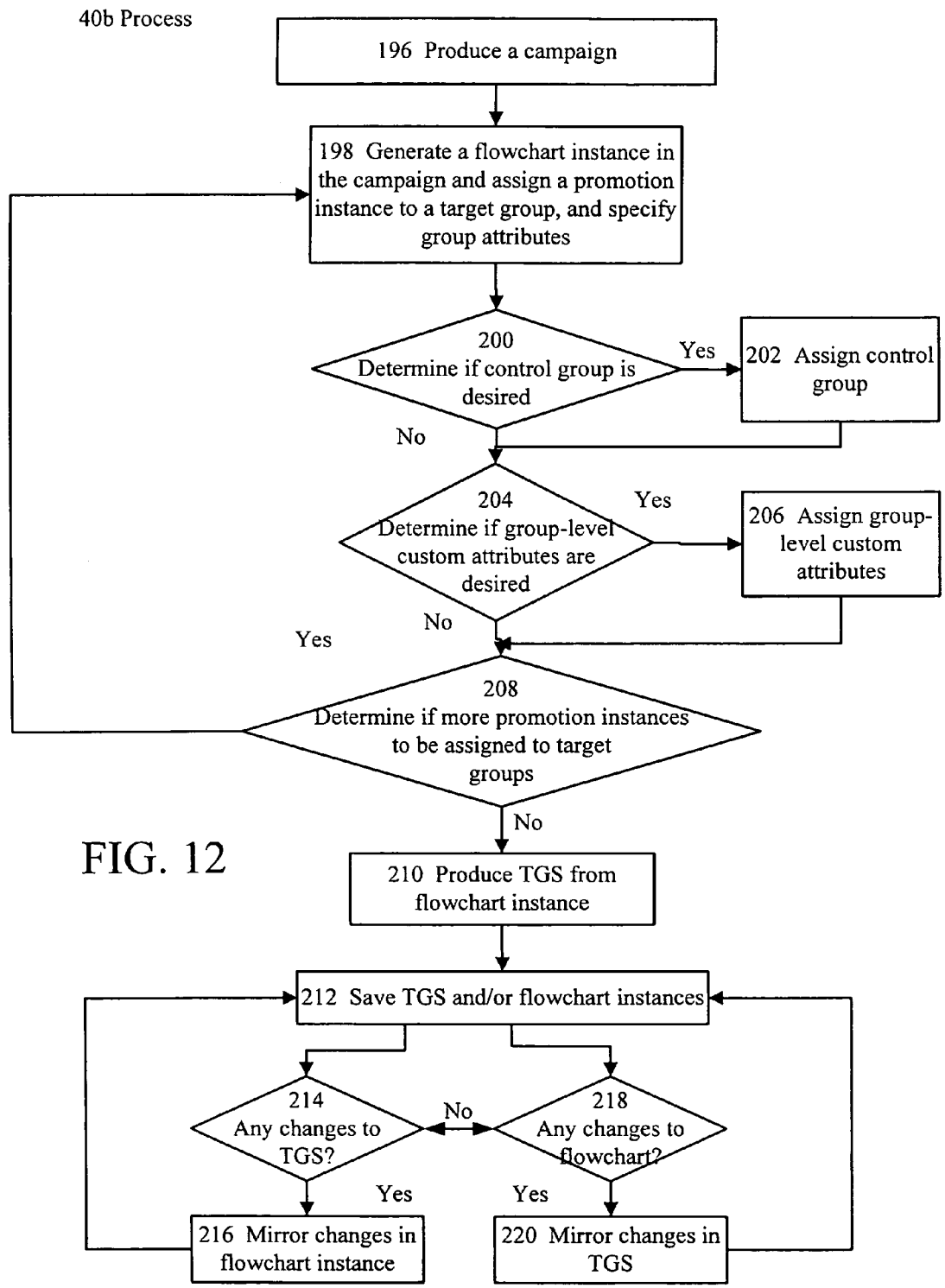

Referring to FIGS. 11 and 12, a group management process 40*b* that manages the assignment of promotion instances to groups is shown. Groups, and in particular target groups, are collections of contact entities to be targeted in the marketing campaign. Group management process 40*b* can be implemented as either a top-down campaign definition or a bottom-up campaign definition. Top-down campaign definition refers to defining a marketing campaign at a conceptual level (a description of the marketing campaign the user intends to implement). A top-down campaign definition can support, for example, a marketing planner who has access to volumes of raw data and is better suited to plan the marketing campaign at a conceptual level. This approach also allows promotions to be produced before or after the targeting criteria have been established. A bottom-up campaign definition refers to defining a marketing campaign at an implementation level and provides a visual representation of the treatments (promotions assigned to target groups) in a marketing campaign. Thus, bottom-up campaign definition can support, for example, a technical marketer to augment an existing marketing campaign with additional promotions derived from day-to-day interaction with contact entities. Combined, the two-level planning and review structure of both the top-down and bottom-up campaign definitions can serve as quality assurance for the marketing campaigns as a whole.

Referring to FIG. 11 in a top-down campaign definition, the user produces a structure to manage records 170. One such structure is a target group spreadsheet. Other structures could be used, such as a table. The structure, as a target group spreadsheet includes rows representing the target groups in the marketing campaign. The rows log what promotion instances have been assigned to which target groups of contact entities. When the user desires to add to the marketing campaign, the user generates a row 172 in the target group spreadsheet, assigns one or more promotion instances to the target group. The user can assign the promotion instance and leave the specification of the parameterized attribute values to the user implementing the marketing campaign, or he can specify one or more of the parameterized attributes to be used with each promotion instance.

The user also specifies group attributes of the target group in the target group spreadsheet. The group attributes are customizable and represent information about the target group that may be output as part of the contact list generated by the marketing campaign, the selection criteria or definition of the target group, or used for data analysis/reporting. Group attributes can be a group name/category, a unique group code to identify the target group, the minimum and/or maximum group size, the group source identifier, the age, income, recency, frequency, or monetary values defining the target group. When the custom group attributes represent selection criteria, these fields and their values can be made available in the campaign/flowchart to implement the selection logic without duplicate data entry. These group attributes are entered into the row.

The user determines whether a control group should be assigned to the target group 174. As explained above, the hold-out control group represents marketing entities that would be statistically representative (e.g., similar in demographic or financial bracket) to the marketing entities of the target group. The user uses the control group to test the effectiveness of the marketing campaign (i.e., measure the incremental benefit of sending the promotion, also known as "lift" over the control group). If the user determines that a control group is desired, then the user assigns a control group to the target group 176. The control group is measured against every promotion instance assigned to its target group. A control group can be used multiple times for different target groups if desired. Next, the user determines if group-level custom attributes are desired 178. The order of determining whether a control group is desired 174 and determining if group attributes are desired 178 can be reversed if desired in the group management process 40b.

Otherwise, if a control group is not desired 174, then the user continues to determine if group-level custom attributes are desired 178. If the user determines that group-level custom attributes are desired 178, then the user assigns one or more group-level custom attributes to the target group 180 and enters values for the custom attributes in the target group spreadsheet. Selected group-level custom attributes are available for every row in the target group spreadsheet. Then the user determines if there are more promotion instances to be assigned to target groups 182. Otherwise, if a group-level custom attributes are not desired, then the user determines if there are more promotion instances to be assigned to target groups 182.

Group-level custom attributes are, in addition to the promotion attributes described above. Attributes are assigned to the target group independently from when the promotion instance is assigned to the group (they can be assigned/filled in at any time after the target group row has been produced). Group-level custom attributes can be assigned to both target and control groups. The group-level custom attributes represent information specific to the group. For example, group-level custom attributes can be the target group size representing the minimum or maximum number of contact entities in the group. The group-level custom attributes can also be a group description or a designation that the group is of control group type or target group type. The user can also specify the audience type of the contact entities of the group, whether the type be a cross-sell, upsell, defection, loyal, or retention. The group-level custom attributes can also be an audience affinity, designating the group as contact entities within a company division, or an audience source, designating where the source of the contact entities. The audience source can be derived from a rental list, owner list, prospect list, or a lead list. The group-level custom attributes can also designate a lead source, the lead source being television, road-show, radio, or direct mail.

Still referring to FIG. 11, if the user determines that there are no more promotion instances to be assigned to target groups 182, then the process produces one or more campaign flowcharts 184 (i.e., the implementation of the marketing campaign organized into different groups of execution logic for convenience if desired) using the target group definitions in the target group spreadsheet. In the illustrated example of FIG. 13, the campaign flowchart 220 allows a low-level user, such as a technical marketer to implement the marketing campaign based on the definition provided by the marketing planner in the target group spreadsheet 222 (in some cases, the marketing planner and the technical marketer may be the same individual). The flowchart instances have access to the group-level custom attributes of the rows of the target group spreadsheet.

Figure 11A:
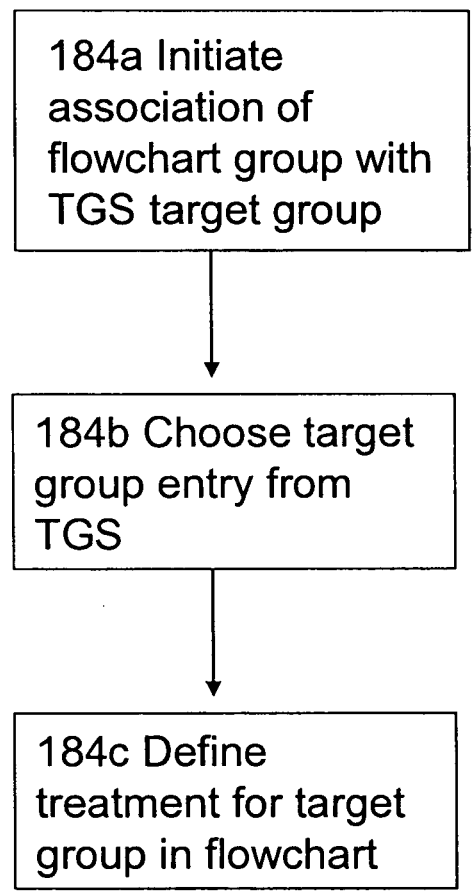

As shown in FIG. 11A, the process of producing a flowchart from the target group spreadsheet 184 can be broken down into the following steps. When the technical marketer produces a target group in the flowchart, he can then associate it with the appropriate top-down entry in the target group spreadsheet. This association causes the group in the flowchart to automatically inherit all of the attributes of the target group defined in the target group spreadsheet, including the assigned promotion instances, control group, and group-level custom attributes. The technical marketer initiates the target group association process 184a. This displays a list of the target groups entries from the target group spreadsheet (this can be filtered to show only the entries that have not yet been associated with another group of a flowchart). The technical marketer then chooses a target group entry to associate with the current flowchart group 184b. The group automatically inherits the target group spreadsheet entry's group name and code. In addition, when the technical marketer configures the treatment of that flowchart group 184c, the promotion instances and control group, and group-level custom attributes from the target group spreadsheet entry are automatically applied.

The user saves the target group spreadsheet and/or the campaign flowchart 186. Thereafter, the user can edit the information in the rows of the target group spreadsheet and in the flowchart instances of the campaign flowchart. If there are changes to the target group spreadsheet 188, then the process mirrors the changes in the campaign flowchart 190. Similarly, if there are changes to the campaign flowchart 192, then the process mirrors the changes in the target group spreadsheet 194. The user saves the changes to the target group spreadsheet and/or campaign flowchart 186. In some implementations, the user can make multiple changes to either the target group spreadsheet or the campaign flowchart before saving. However, the process will mirror the changes after a save.

Referring to FIG. 12, in a bottom-up campaign definition, the user produces an overall representation of a campaign 196, which could be visual, such as a nodal diagram, graph or as will now be discussed, a campaign flowchart. The campaign comprises flowchart instances 198, the flowchart instances being visual representations of the execution logic used to produce the intermediate groups and final target groups (e.g., to handle selection, suppressions/exclusions, segmentation, sampling, audience-level switching or grouping contacts into households). The flowchart instance also includes what promotion instances have been assigned to which target groups of contact entities, as well as control group assignments. When the user wishes to add to the marketing campaign, the user generates a flowchart instance in the campaign, assigns one or more promotion instances to one or more target groups, and/or specifies group attributes of the target group(s). These group attributes can be entered into the flowchart instance (or in the target group spreadsheet).

The user determines whether a control group should be assigned to each target group 200. If the user determines 200 that a control group is desired, then the user assigns a control group to the target group 202, and determines if group-level custom attributes are desired 204. Otherwise, if a control group is not desired, the user determines if group-level custom attributes are desired 204. If the user determines that a group-level custom attributes are desired 204, then the user assigns one or more group-level custom attributes to the target group 206 and enters values for the custom attributes in the flowchart. Then the user determines if there are more promotion instances to be assigned to target groups 208. Otherwise, if group-level custom attributes are not desired, the user determines if there are more promotion instances to be assigned to target groups 208.

If the user determines that there are no more promotion instances to be assigned to target groups 208, then the process produces a target group spreadsheet from the campaign flowchart 210. The target group spreadsheet comprises rows with group attributes which are populated from the group attributes of the flowchart instances of the campaign, i.e., the bottom-up entries, in addition to any top-down produced entries.

The user saves target group spreadsheet and/or the campaign flowchart 212. Thereafter, the user can edit the information in the rows of the target group spreadsheet and in the flowchart instances of the campaign flowchart. If there are changes to the target group spreadsheet 214, then the process mirrors the changes in the campaign flowchart 216. Similarly, if there are changes to the campaign flowchart 218, then the process mirrors the changes in the target group spreadsheet 220. The user saves the changes to the target group spreadsheet and/or campaign flowchart 212. In some implementations, the user can make multiple changes to either the target group spreadsheet or the campaign flowchart before saving. However, the process will mirror the changes after the save.

The top-down and bottom-up campaign definition processes are described separately for ease of comprehension, but these two processes can be arbitrarily intermixed. That is, some target groups can be defined top-down and associated with flowchart groups, some can be defined top-down and not used by any flowchart group, and some can be defined bottom-up. All three of these states are visually differentiated in the target group spreadsheet to facilitate understanding and verification of the entire campaign development process.

Having defined the marketing campaign by assigning promotion instances to target groups, the marketing campaign can be further customized and personalized to target the specific needs or desires of the contact entities in the target groups. Thus, promotion instances can produce promotion versions, which are permutations of the promotion instances depending on variations of parameterized attributes of the promotion instances.

Figure 14:
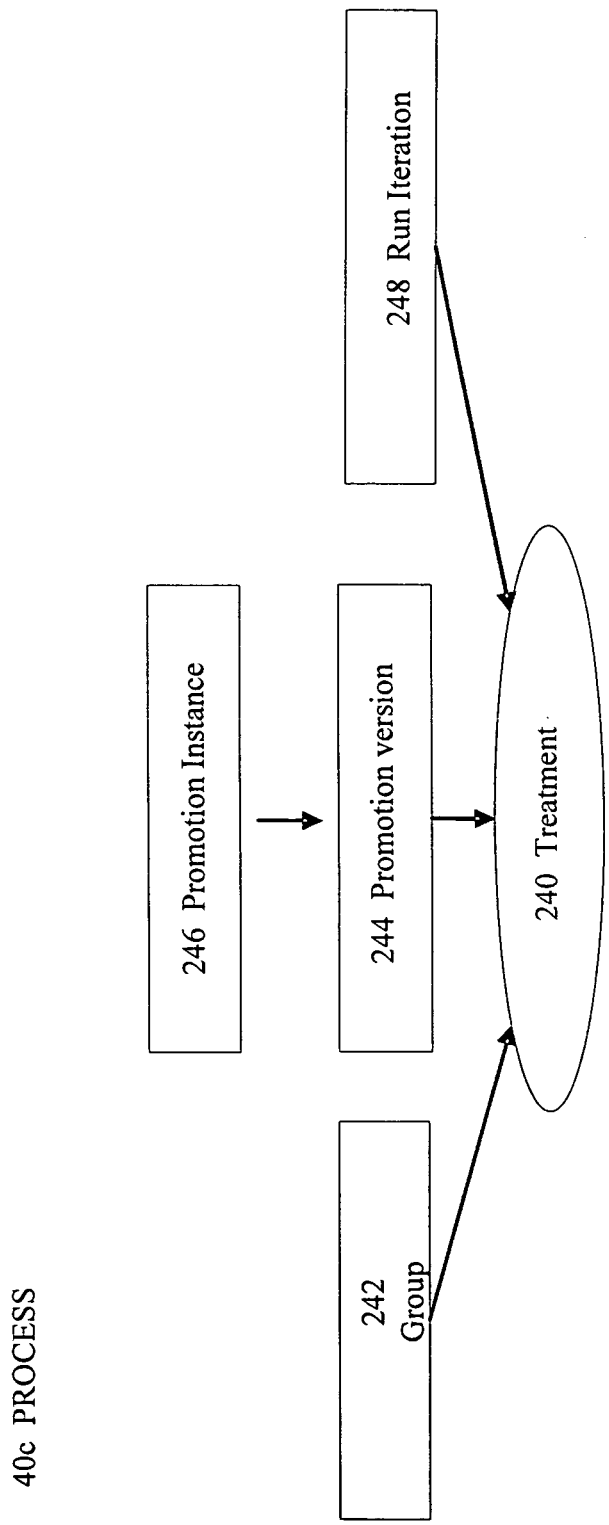
FIG. 14 is a flowchart depicting producing treatment instances.

Referring to FIG. 14, the execution of the marketing campaign process 40c (in production as opposed to a "test run") produces a treatment instance 240, which is the intersection of a target group 242 (marketing entities being promoted to or treated, which may be a specified list of audience IDs or a group with unspecified details (e.g., mass marketing where the count of target entities may be known, but the specific identities are not).), a promotion version 244 (of promotion instance 246 given to the group), and a run time 248 (the specific date/time the marketing campaign flowchart is run). When the user runs the marketing campaign process 40c and assigns the promotion instance 246 to the target group 242, the user specifies the values of the parameterized attributes, as discussed earlier, producing promotion version 244.

Once the campaign is run and the treatment instance is produced, treatment code generator 68 (FIG. 5) generates a unique treatment code to identify the treatment instance 206, e.g., "ABCDEFGH" for the treatment instance, based on the treatment code format 64, e.g., "aaaaaaaa". The user can clear (delete) contact history by the run instance by viewing and selecting from a list of run date-times (this is useful if a marketing campaign was run in production in error or it was later decided not to send out the promotions from the campaign).

Additionally, once the user produces a promotion instance, the user can retire the promotion instance. Retiring prevents further use of the promotion instance, so that the user cannot assign the retired promotion instance to any groups and any group already assigned the retired promotion instance will not be marketed (e.g., the flowchart will generate an error when run). The promotion instance no longer appears in the promotion tree hierarchy. However, it is still available for reporting/analysis purposes.

Figure 15:
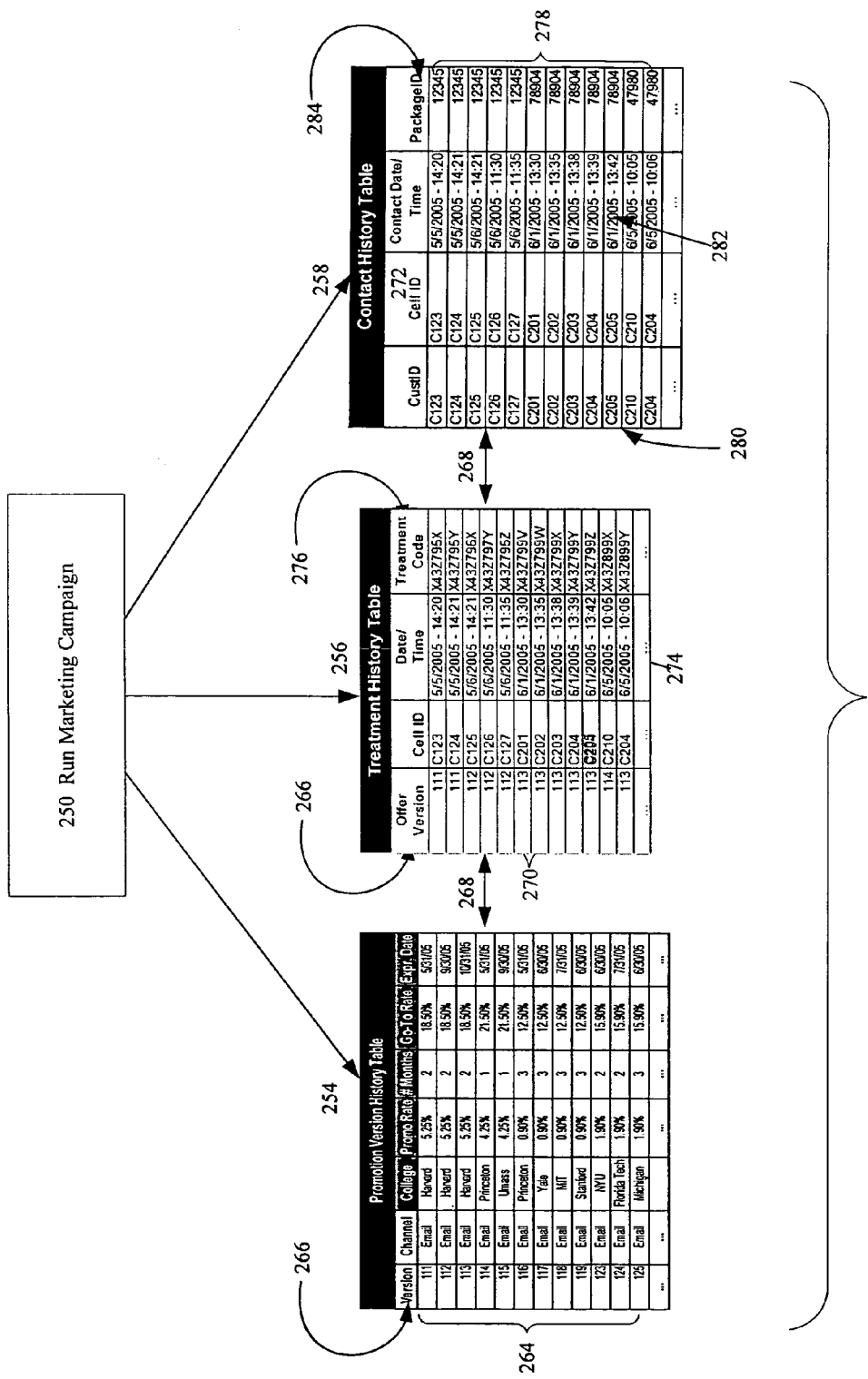
FIGS. 15 and 15A are a diagram and flow chart depicting contact history and a contact history process.
Figure 15A:
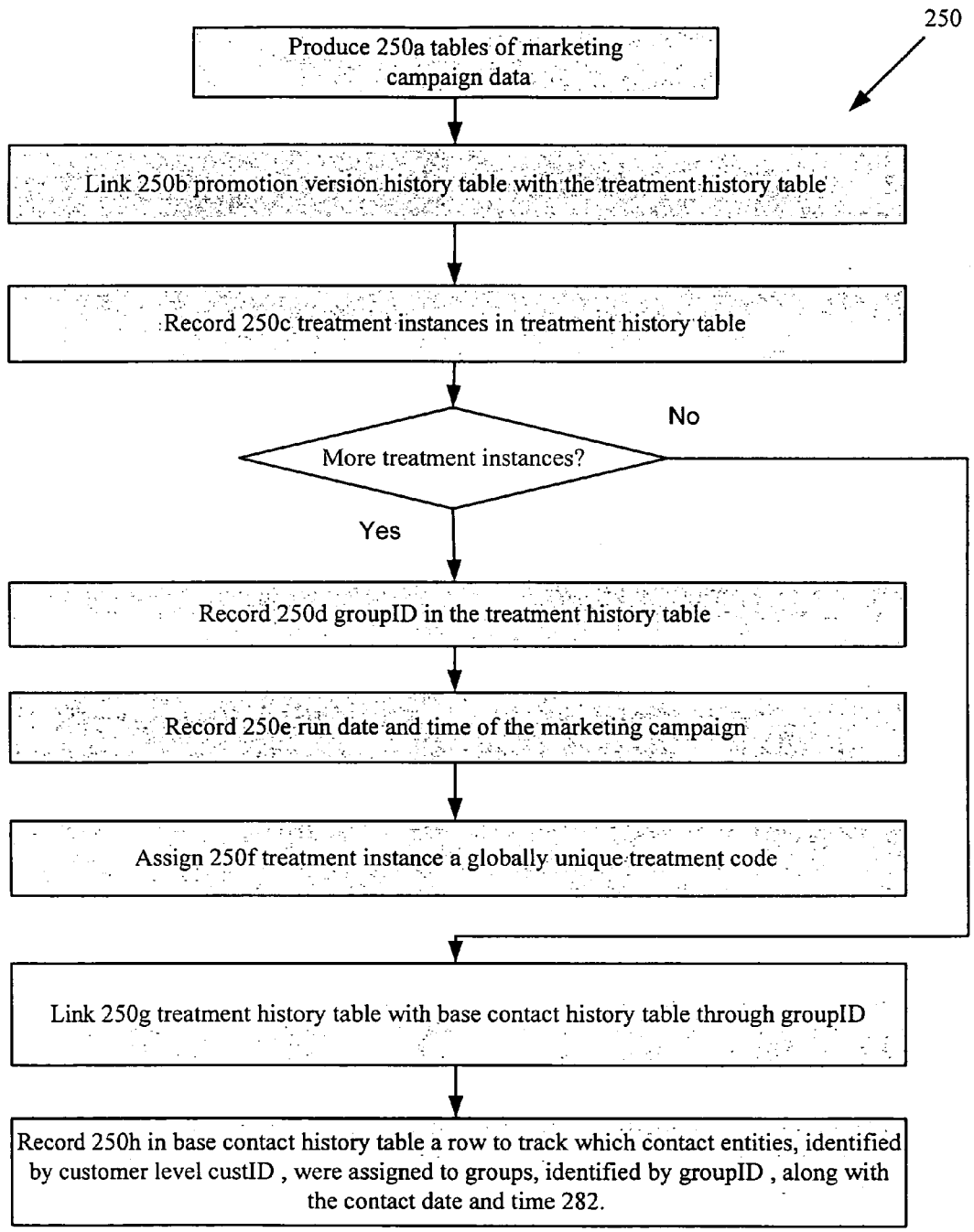

Referring now to FIGS. 15 and 15A, once a marketing campaign is run 250, contact history process 40d of the promotion management software produces 250a (FIG. 15A) tables of marketing campaign data to maintain a contact history of the campaign. Contact history process 40d provides a historical record of every communication made to a marketing entity providing detailed information on exactly what was given to whom, when, and how (in order to track responses). It also includes tracking of every contact entity held out from a promotion in a control group (required for inferred response tracking). Contact history may be written at the time that contact lists are generated (e.g., when the flowchart runs) or they may be deferred and written later (e.g., after an approval process or confirmation that the delivery was completed).

Contact history can provide an accurate way to count the number of "interruptions" to a contact entity in view of the number of promotion instances assigned to the contact entity (entries where an individual is part of a hold-out control group are automatically eliminated from this count based on the entry's contact status). Accurate management of interruptions is critical for marketers to prevent customer fatigue (negative behavior, such as opting out from marketing communications or a decrease in response behavior) when the frequency of communications is too high. If the user wishes to limit the number of contacts per entity over a given period of time, logging contact history according to packages can serve to help limit contact fatigue by accurately tracking the number of interruptions. In addition, since contact history can grow extremely large for an organization with many customers or prospects, the ability to compress this data without loss of information is desirable. The combination of base contact history and detailed contact history provides this compression benefit whenever possible (i.e., all members of the same target group receive the same treatments), without losing granular data when members of the same target group receive different promotions.

Interruptions may refer to the number of actual communications, or "packages," made to contact entities over a given contact channel and can contain multiple promotion instances. A mechanism is provided in the campaign management solution to define which contacts are considered part of the same package. For example, a package might be defined as all of the treatments generated within a single contact-style process box corresponding to a marketing campaign.

For example, suppose a contact entity receives multiple promotions in a marketing campaign. The multiple promotions can be sent over the same contact channel, e.g., by direct mail, or over multiple contact channels, e.g., a combination of direct mail and electronic mail. In order to track the number of interruptions made to the entity, the process 40*d* treats the multiple promotions assigned through the same contact-style process box as a single interruption, or "package," as opposed to treating each of the multiple promotions assigned as a separate interruption. Thus, in the case where the user promotes fifty different promotions to a target group in a contact-style process box, i.e., in the same envelope via direct mail, each of the fifty promotions are considered part of the same package, and constitute a single interruption to each marketing entity. In the case where the user promotes thirty promotions over direct mail, and twenty by electronic mail, then by this definition, there are two packages since the user is interrupted twice.

Contact history 252 includes a promotion version history table 254, a treatment history table 256, and a base contact history table 258. Each table comprises an aggregate of marketing campaigns executed over time (of both targeted groups and control groups). There is a separate contact history table for each audience level (though these could populate the same underlying physical database table). Audience levels represent different types of marketing entities that can be contacted, including the household level, the customer level, and the account level. In this hierarchy, households may contain one or more individuals (customers) and customers may hold one or more accounts (many-to-many relationship).

The promotion version history table 254 is a record of all promotion attribute values for each promotion version 266 for all marketing campaigns (including the campaign 250) when they are executed. Each promotion version 266 is assigned a unique promotion version number 264. The promotion version history table 254 captures the values for both parameterized and static attributes as assigned. A variation of the promotion version history table can capture the parameterized attributes, which can save tremendous storage space as static attributes typically do not change. Static attribute values can then be retrieved directly from the promotion instance definition (furthermore, the application could prevent the changing of any static promotion attribute values after a promotion instance has been used in any campaign).

The promotion version history table 254 can be linked 250*b* (FIG. 15A) via pointer 268 with the treatment history table 256 through the promotion version numbers 270. The treatment history table 256 records 250*c* (FIG. 15A) treatment instances 270 produced when the marketing campaign is executed 250, as discussed above. For each treatment instance 270, the treatment history table 256 records 250*d* (FIG. 15A) the groupID 272 identifying the target group of the promotion version (as enumerated by the promotion version number 270). The run date and time of the marketing campaign 274 also recorded 250*e* (FIG. 15A). Each treatment instance 270 is assigned 250*f* (FIG. 15A) a globally unique treatment code 276 for exact identification of the specific marketing instance for tracking responses. Rows in the treatment table also could have custom attributes for tracking additional treatment details (e.g., estimated size of the target group for brand marketing communications).

For every target group that is assigned a control group, there is corresponding control treatment instance produced for every treatment instance (and subsequently linked to the treatment instance). For example, if target group G is assigned two offers A and B and is assigned control group C, the treatment history table 256 records two treatment instances G-A and G-B (for group G receiving offer A and B) and two control treatment instances C-A and C-B (for group C receiving offer A and B) where C-A is linked to G-A and C-B is linked to G-B.

The treatment history table 256 can be linked 250*g* (FIG. 15A) 268 with the base contact history table 258 through the groupID 272 and the package ID. When the marketing campaign is executed, the base contact history table 258 records 250*h* (FIG. 15A) a row 278 to track which contact entities, identified by customer level custID 280, were assigned to what groups, identified by groupID 272, along with the contact date and time 282. The contact date and time 282 is initially set to the date and time the marketing campaign is executed, but the date and time 282 can be updated to reflect subsequent updates to the record (e.g., updating the contact status from "Attempted delivery" to "Undeliverable") made with the contact entity, as described in further detail below.

In a similar manner, the base contact history table 258 also tracks the entities assigned to control groups. The storage of group membership information in the base contact history table 258 is highly compact when all members of the same group receive the same promotion versions. When this is not the case, the exact contact information is stored in detailed contact history (discussed below).

As discussed earlier, a "package," designated in the base contact history table 258 as packageID 284, represents a single "interruption" of the contact entity. This can be represented as the multiple promotion versions assigned in a contact-style process box over a single contact channel a marketing campaign, or it can be a value explicitly assigned by the user to group together multiple promotion instances/communications. For example, as shown in the treatment history table 256, promotion version number 113 is assigned to five groups, C201, C202, C203, C204, and C205 when a marketing campaign is executed on Jun. 1, 2005. Although the customers of the five groups are respectively labeled with groupIDs of C201, C202, C203, C204, and C205, as shown in the base contact history table 258, the packageIDs for those entries are the same, namely, "78904." If a marketing entity is a member of more than one of these groups, the promotion versions from the same contact-style process box assigned to their respective entities are considered one interruption.

The rows 278 of the base contact history table 258 also include a contact status (not shown). The contact status provides flexibility in tracking the status of a contact entity that has been promoted. Each contact status defines whether or not it counts as a contact/interruption to the recipient. For example, a promotion version "served" to a call center representative's screen that has not yet been presented to the caller does not count as a contact. Once the promotion version has been "read" to the caller, it may have a change of contact status to "Presented" which does count as a contact. In some implementations, contact status is conducted at the package level. In such cases, the user updates contact status for all promotions within the package.

Figure 15B:
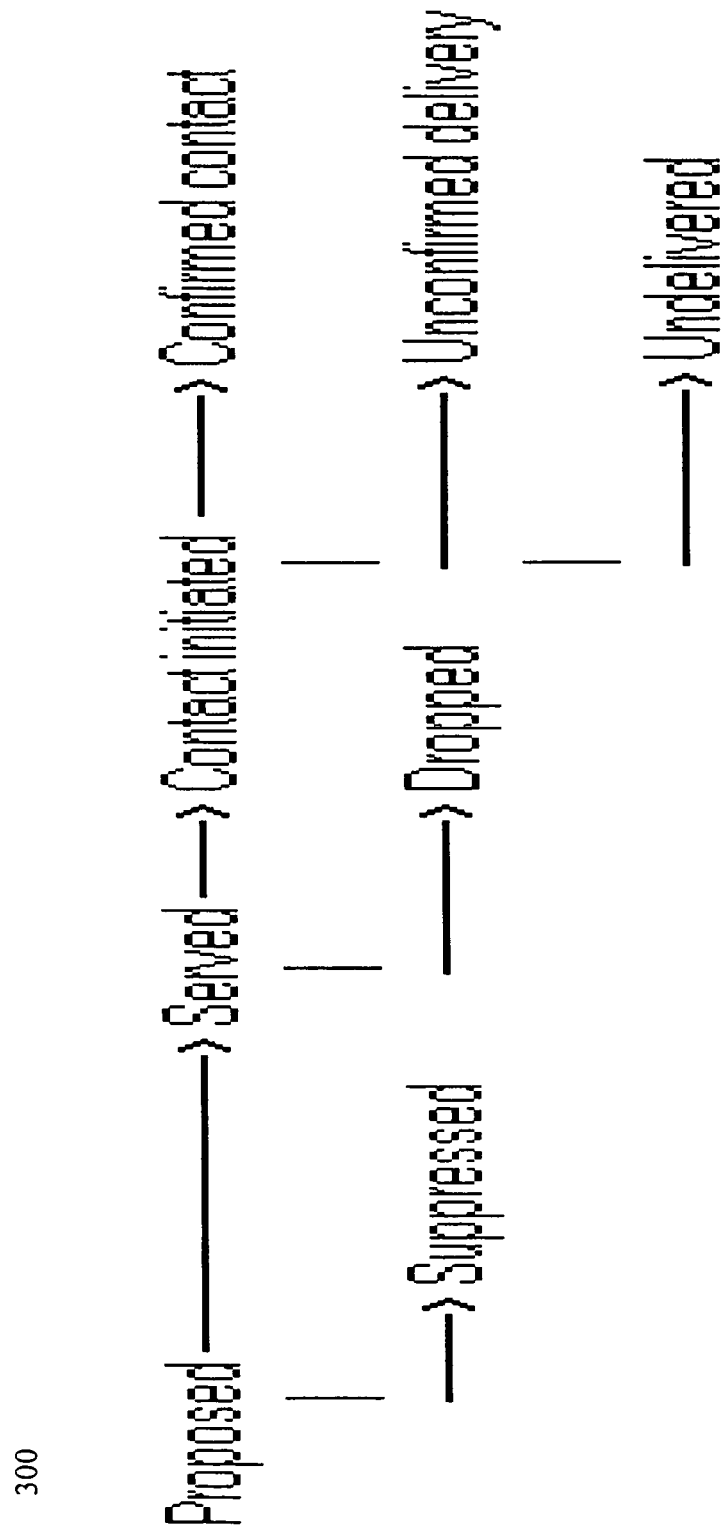
FIG. 15B is a tree depicting the hierarchy of contact history.

The user can customize the status entries associated with the contact status. For example, as shown in FIG. 15B, contact status tree 300 can track the status of a promoted contact entity. The contact status tree can be structured so that the user understands the hierarchical meaning of a particular contact status (i.e., there is only one path to any given status). For example, a row 278 could have a status of "served" when the promotion version is assigned to the target group and the marketing campaign is executed. If the user promoted the promotion over email and, for instance, requested a read receipt, upon return of the read receipt, then the contact status could be updated to "confirmed contact." The update date and time 282 would be updated accordingly (the contact date and time remains the same). If, by chance, a second user reviews the base contact history table and views the "confirmed contact," then, by virtue of the hierarchical structure of the contact history tree, the second user understands that "contact initiated," "served" and "proposed" contact statuses were necessarily met. By the same token, the second user knows that the contact could not have been "dropped." It is possible to have customized contact statuses where the system has no knowledge of any hierarchy and contact history simply tracks the current contact status value. For each contact status value, the system can configure whether the contact status actually "counts as a contact" or not (e.g., "proposed" and "undelivered" would not count as contacts, while "contact initiated" and "contact confirmed" would.

It is also possible to append additional rows to contact history to effectively update the contact status, allowing the recording of the specific date and time of each contact status change, though this can cause contact history to grow significantly. A special contact status is used for records written to contact history for control groups (and thus can be easily filtered out when computing "interruptions").

In some implementations, contact history includes additional tables (not shown) such as a group history table, a campaign history table, a strategic segment history table, and a detailed contact history table. The group history table logs changes to the target group spreadsheet entries (e.g., changes to group custom attribute values over time). The campaign history tracks changing values of campaign attributes over time (e.g., custom campaign attributes). The strategic segment history stores information about how the company divides the contact entities into groups (i.e., records the membership of marketing entities within strategic segments such as high, medium, or low-value customer segments) over time. Thus, the process allows the system to accurately track history and information for a variety of aspects related to a marketing campaign so that at any given time, the system can reconstruct the state of any marketing object within the system when a communication was made to a contact entity.

The detailed contact history table is similar to the base contact history tables. There is (conceptually) one table per audience level. Detailed contact history tables are used in special cases to track promotions given to contacts on a data-driven parameterized promotion attribute basis (i.e., when promotions are personalized to the contact entity within a target group). This includes the tracking of detailed control group information, where each recipient is held out as a control for the specific promotion versions he would have received if he had not been part of the control group. Detailed contact history tables also track promotions that have been rule optimized to deter contact fatigue. Both of these cases track detailed history in the case where all members of a target group do not receive exactly the same promotion versions. Members of the same target group may receive different numbers of promotions and different promotions, personalized based on the specific contact entity's data. Detailed contact history tables also track promotions assigned to contacts on a real-time basis, where tracking the number of promotion presentations per contact entity is important.

Figure 16:
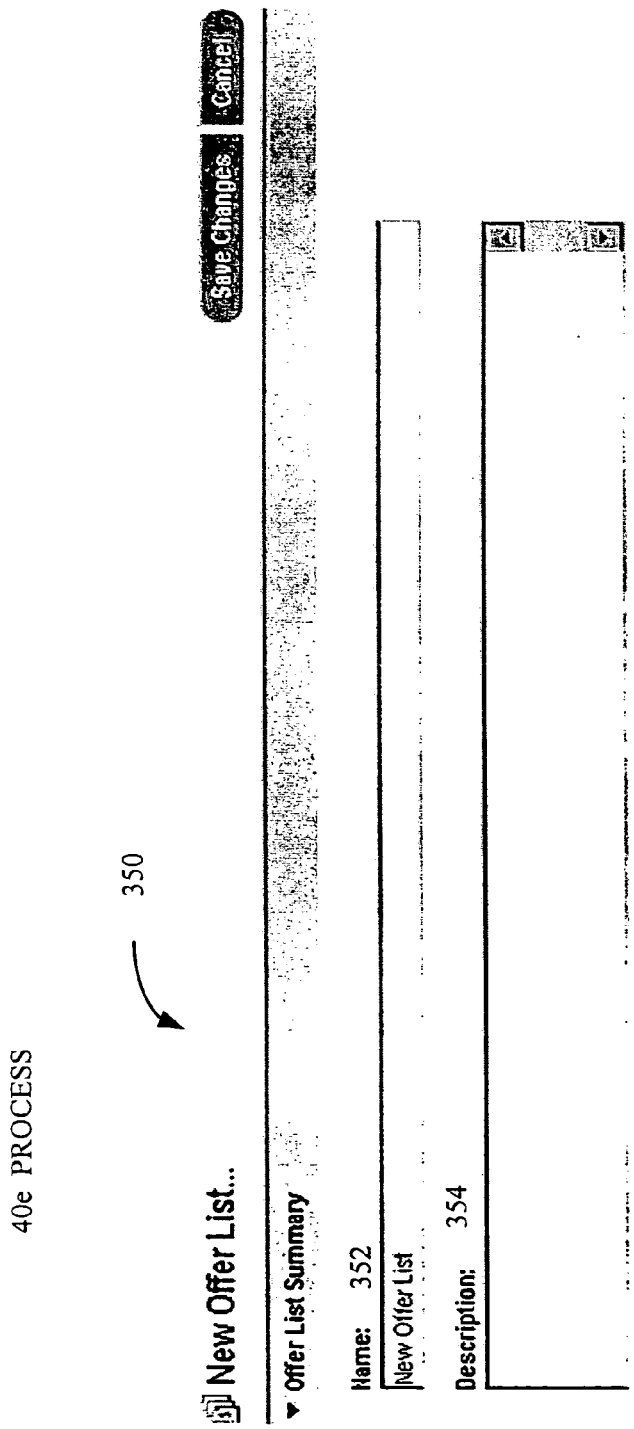
FIG. 16 is a diagram depicting promotion list attributes.
Figure 17:
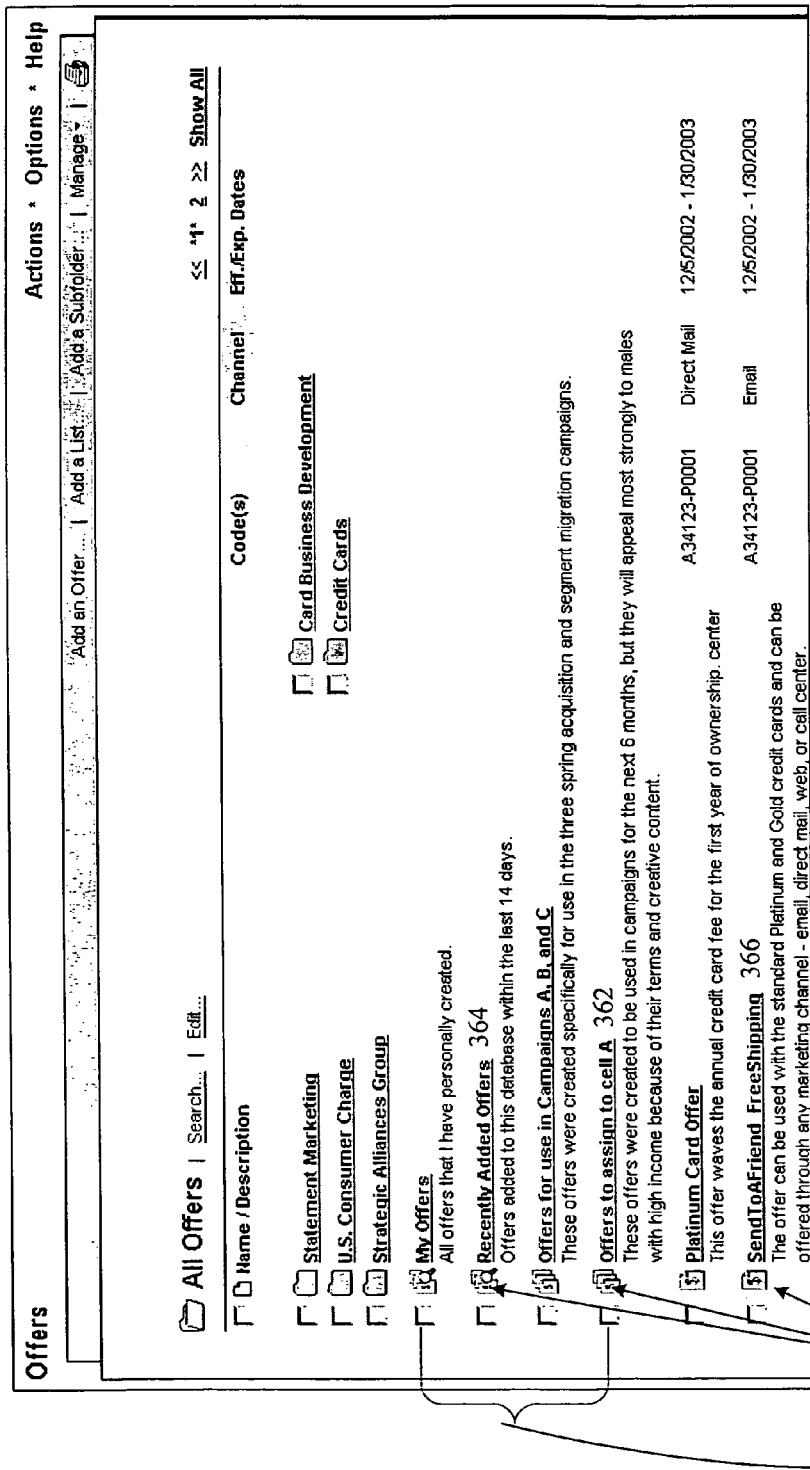
FIG. 17 is a diagram depicting a folder tree view of the promotion list process.

Referring now to FIGS. 16 and 17, a promotion list process 40e to produce promotion lists is shown. A promotion list is a collection of one of more promotion instances and can be used where ever individual promotion instances are used (e.g., for promotion assignment to target groups). The promotion list includes promotion list attributes 350. Promotion list attributes 350 include a unique promotion list name 352 and a promotion list description 354. The promotion list can be a static promotion list or a smart promotion list, both of which are described below. The promotion list is stored on an electronic medium, e.g., the server system hard drive or application database, and can be viewed in a folder tree view 356 (this view can be intermixed with promotion instances). Promotion lists 358 and promotion instances are assigned an icon 360. Thus, when promotion lists are viewed in the folder tree view of FIG. 17, the icon 360 can be used to identify the type of promotion list, e.g., whether the promotion list is a static promotion list 362, a smart promotion list 364, or a single promotion instance 366.

Figure 18:
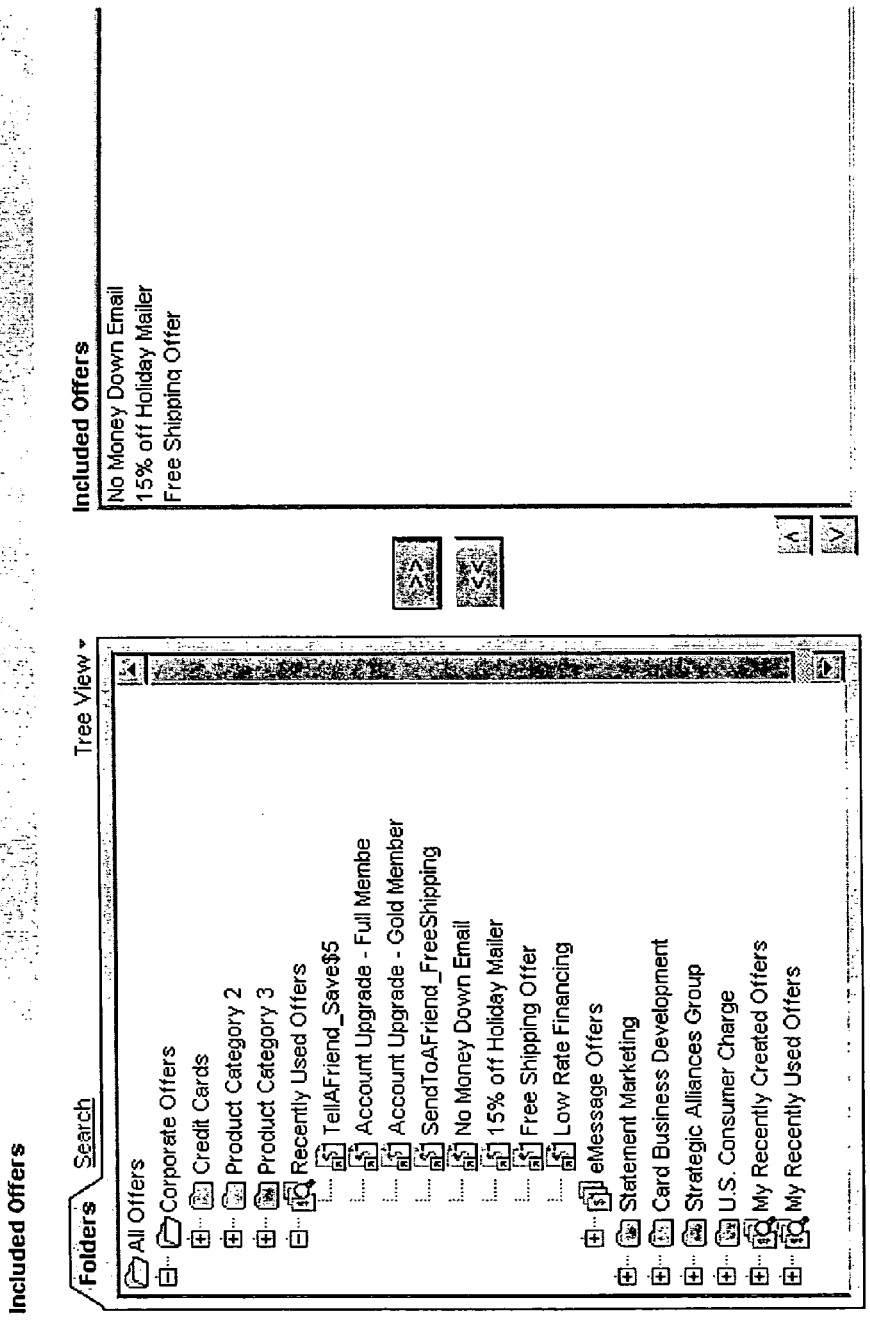
FIG. 18 is a diagram depicting the selection of offers in a static promotion list.

Referring now to FIG. 18, a static promotion list is produced by using a searchable and browsable view (e.g., a folder tree view) 356 of the promotion instances 368 stored in folders 370 on the hard drive of the server 12 or application database 22 (see FIG. 1). The searchable and browsable view allows the user to search, view in a dynamic nested tree, drill into the folder pages, and browse thumbnail views and saved searches. Search for promotion instances can be based on any promotion attributes as well as "inherent attributes" such as the creation or update date/time, owner, folder, promotion template, and security policy. Based browsing or the results of the search, the user selects one or more promotion instances to add to the static promotion list. Depicted are promotion instances within the "Recently Used Offers" folder. The user selects promotion instances "No Money Down E-mail," "15% off Holiday Mailer," and "Free Shipping Offer" from the folder. These promotion instances can be ordered up and down by the user to select their display order/rank. The promotion instances of such a static promotion list will not change until the user repeats this process to add or delete promotion instances to the static promotion list.

Figure 19:
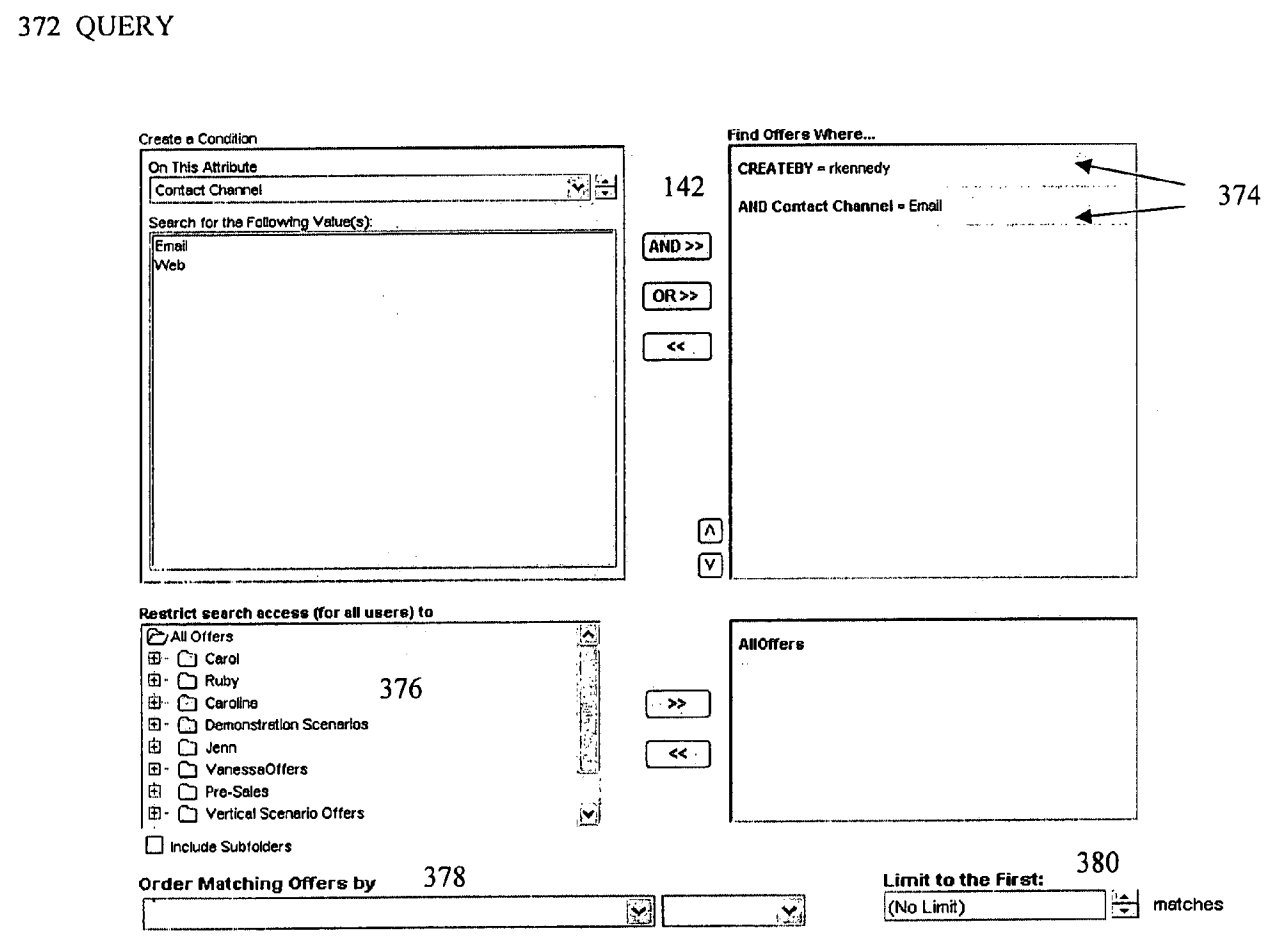

Referring now to FIG. 19, a smart/dynamic promotion list can be produced by querying 372 promotion instances to find promotion instances with matching search criterias 374. The search criteria can be based on promotion attributes, (e.g., Contact Channel, Expiration Date, Cost per offer), other inherent attributes (e.g., owner, creation date, update date, folder, promotion template) and operators, e.g., (>, <, >=, <=, =, !=, begins with, contains, not contains, not begins with). Multiple search criteria can be connected via operators (e.g., AND, OR).

The user constructs a query 372 to send to the search process that searches the hard drive of the server 12 or application database 22 for stored promotion instances to retrieve. The retrieved stored promotion instances will have an owner (CreateBy field) with value of "rkennedy," "AND" channel with value of "Email," as shown in FIG. 19. The "AND" is an example of using a search term that is a Boolean operator to cause the process to include both "rkennedy" and "Email" as search criteria 374. The user can limit the search to specified folders and optionally their subfolders 376. The results can be sorted 378 in ascending or descending order according to one or more specified fields. The results can also be limited 380 to the first N number of promotion instances as ranked by the sorting criteria 378.

The sorting criteria 378 can be based on one or more attributes of the promotion or a calculated field based on attributes of the promotion and multiple attributes/calculated fields may be used to sort based on ties (e.g., select first in descending order based on promotion instance creation date and then for any on the same date, then subsequently sort in ascending order by promotion cost).

The sort 378 and limit 380 features can be useful in limiting the results to a maximum or minimum case. For example, suppose the user wishes to query all promotion instances for gold credit cards, but only wants the promotion instance for the gold credit card with the lowest interest rate. Thus, if the user sorts 378 results of promotion instances for gold credit cards in ascending order by interest rate, and limits 380 the results to the first hit, then the user can find, the promotion instance for a gold credit card with the lowest interest rate. Another example might be to return the top three promotion instances in a folder ranked in descending order by offer score. The marketing communications to a particular group targeted by a monthly marketing campaign can then be managed (e.g., maintained, updated, rescheduled) without having to actually edit the campaign (e.g., by simply by moving offers in and out of this folder). This is a powerful concept in producing periodically recurring marketing campaigns that can run in a lights-out (i.e., without manual intervention) manner, dramatically speeding up an organization's ability to scale and maintain a large number of campaigns.

Figure 20:
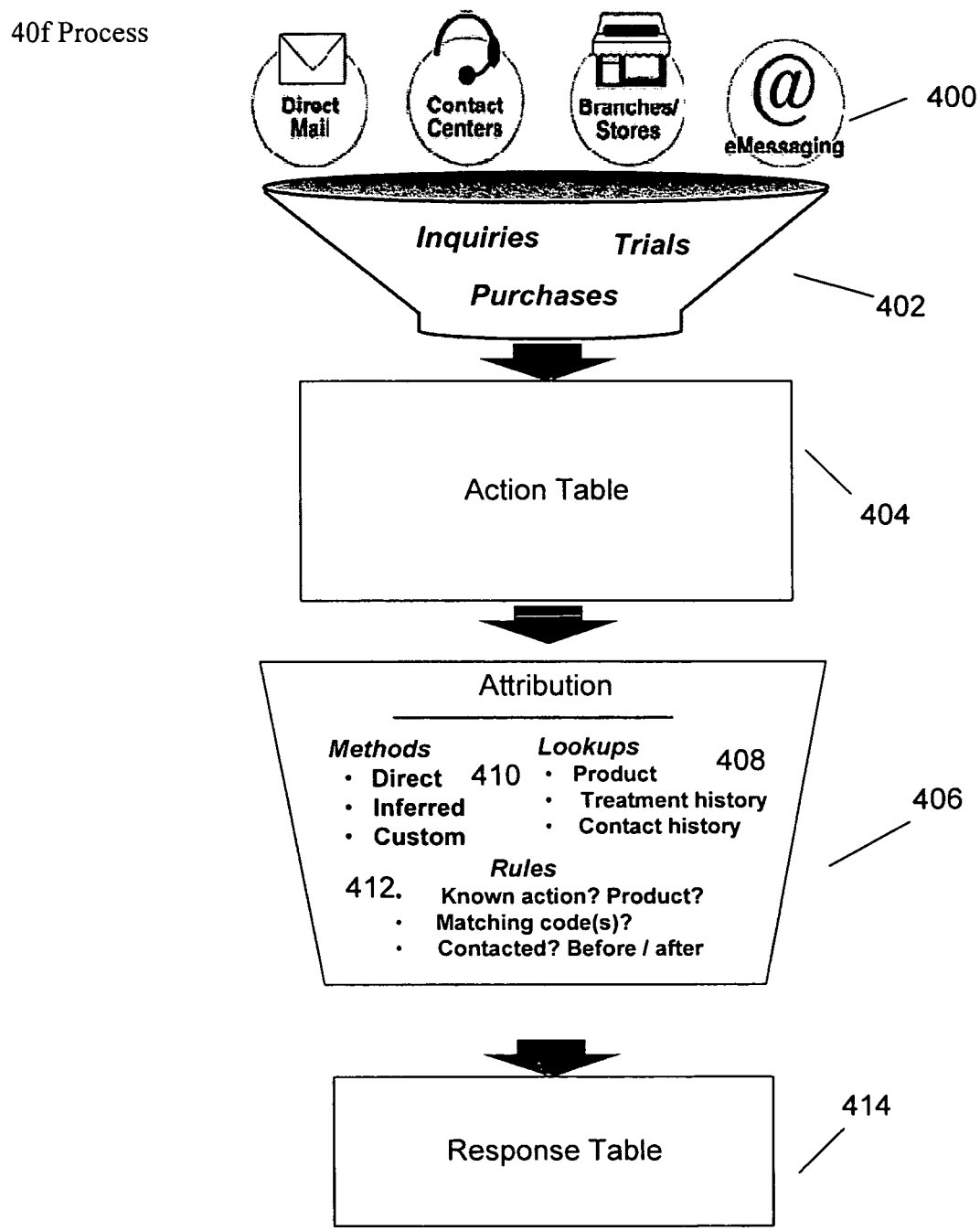
FIG. 20 is a general flowchart depicting the high-level response tracking process.

If the user produces a smart promotion list, the query 372 will dynamically return matching promotion instances at the time the smart promotion list is used (e.g., when a campaign is executed and promotions are assigned to a group via a smart promotion list). Thus, without further user intervention, the process updates the promotion instances of a smart promotion list according to the query 372. For example, as shown in FIG. 20, the promotion instances 380, 382 for a gold credit card with the lowest interest rate 384, 386 may vary day-to-day according to fluctuating interest rates. A smart promotion list 388 can be updated without further user intervention to reflect such fluctuations.

Another key example for smart promotion lists is in building optimization rules based on promotion meta data (e.g., limiting the number of loan offers an individual may receive to three a quarter). The optimization rules regulate the use of limited marketing resources or limited audience tolerance for marketing interruptions, to optimize, for example, performance or profitability. As new promotion instances are produced that are credit vehicles, they would automatically be picked up by the smart promotion list based on specified query conditions.

Once a marketing campaign has been executed, the user can then run a response tracking process to track and assess the performance of the marketing campaign and the promotions. The response tracking process 40f tracks duplicate and unique responses. The response tracking process also tracks responses from customers that were originally targeted by the marketing campaign, or alternatively, responses from customers as a result of viral marketing, i.e., customers who come to know of promotions as a result of word of mouth or pass-alongs and provide a system-generated code (e.g., campaign, promotion, group, or treatment code) with their response. The response tracking process also tracks responses before or (for some configurable time period) after the expiration date of the promotion. The configurable time period may be a single value for the entire system or it may be different values depending on the promotion type, the promotion channel, etc. (e.g., an organization may want to track "late" responses for email offers for a period of three days, telemarketing offers for a period of seven days, and direct mail offers for thirty days).

Referring to FIG. 21, the response tracking process 40f receives events or actions performed by audience members that may represent direct or indirect responses to promotion instances, as reported 400 to the system through various contact channels such as direct mail, contact centers, branches or stores, or eMessaging, e.g., electronic mail. The responses types 402 can vary from inquiries related to the promotion version of a treatment instance, to sign-ups for trial periods for goods or services related to the promotion version of a treatment instance, to actual purchases for goods or services related to the promotion version of a treatment instance.

The information reported 400 can be entered into an action table 404, one per audience level. Each row of the action table (an event) includes multiple fields to be used to log the data associated with each response. For example, action table fields include the audience field(s) associated with contacted entity making the response, and the date and time of the response. The event also identifies the "response type," system-configurable categories of responses (e.g., click-throughs, purchases, account activation, inquiry, etc.). Complex responses requiring a sequence of actions also can be handled by submitting an appropriate event and response type (e.g., purchase of two Disney™ digital versatile discs (DVDs) after purchasing The Lion King™) to the action table, based on detecting the presence of the appropriate purchase transactions.

Each response type definition indicates whether it counts as a response (i.e., whether it rolls up as a response in performance reporting). For example, while a marketing user may track the number of inquiries for a credit card promotion, the number of applications, the number of subsequent activations, and the number of times the card is used within the first month post-activation, only some of these response types are typically identified as counting as a response for roll-up or financial return on investment calculations (e.g., inquiries may not count, but card activation may count; or click-throughs may not count, but purchases may count).

The action table 404 also includes fields for the possible response codes (e.g., a campaign code, a promotion code, a group code, or a treatment code). These response codes are used to help identify one or more treatment instances that were promoted to the contacted entity. For example, the response code could be printed on the coupon or other promotion item, and would be included in the data associated with the response. Other fields in the action table 404 include fields for promotion attributes of the promotion, and these attributes can be either static, parameterized, or both. For any of these fields, the user enters the data known from the response. It is possible that some information is not known, and the fields for the unknown information are null.

The fields in the action table 404 also include a response type field. The response types may include a click-through, an inquiry, opening an account, a purchase, activating an account. Each row of the action table (an event) is associated with one response type. Therefore, multiple responses to the same promotion, for example, an inquiry followed by a purchase, are two events (i.e., two row entries) in the action table corresponding to the two response types. In order words, responses associated with multiple action types, even responses from the same contacted entity on the same promotion, are entered into the action table 404 multiple times. (If a response type hierarchy is defined and there is only one path to any given response type, multiple entries are not required for different response types and the occurrence of response types prior to the currently reported response type can be inferred).

The fields also include a product type field, corresponding to code or other identifier of the goods or services promoted in the marketing campaign, which can be compared to a list of products associated with a promotion instance for inferred responses.

When the response events are entered into the action table 404, the responses are attributed 406 to one or more treatment instances. As discussed earlier, treatment instances correspond to a promotion version assigned to a group of contacted entities during the execution of a marketing campaign. Attributing responses to one or more treatment instances credits one or more treatment instances for triggering the response. Attributing 406 includes identifying 408 one or more possible treatment instances to receive credit for the response, and distributing 410 the credit between the one or more designated treatment instances according to a set of rules, and recording relevant information about the response 412, such as whether the respondent was in the originally contacted group and/or whether the response date was on or prior to the promotion expiration date.

Attributing 406 includes identifying 408 one or more possible treatment instances to receive credit for the response includes determining 410 whether the response is one of two basic types of responses: a direct response or an inferred response. For a response to be a direct response, the response information received includes one or more response codes. In other words, a direct response includes a system-generated code that was sent out with the promotion (e.g., either a campaign code, a promotion code, a group code, or a treatment code). These codes are matched to treatment instances through lookups of the treatment history table or other contact history tables. An inferred response does not include response codes and can only be credited if the treatment instance contacted the responder. In both direct and inferred responses, promotion attributes reported with the response are used to further assist in identifying one or more possible treatment instances to credit. Similarly, if a product code is reported with the response, the product code can be matched against a promotion instance's relevant products in a product table, the products being goods or services promoted in the marketing campaign. The promotion attributes and product codes, if reported with the response, are therefore important in identifying treatment instances in the inferred response case.

In some implementations regarding the direct response, if the treatment code is known with the response, then an exact and unique treatment instance can be identified (without any further information). This is a direct exact response. Otherwise, if the treatment code is not reported but other response codes are reported, it is foreseeable that multiple possible treatment instances are identified. This is a direct inexact response. For example, if the campaign code is known, then the range of possible treatment instances can be narrowed to those treatment instances with promotion versions executed in the marketing campaign associated with the campaign code. However, if the campaign contained multiple promotion instances and/or ran multiple times, the exact treatment instance is not known from the campaign code alone. In another example, if the promotion code is known, then the range of possible treatment instances can be narrowed to those treatment instances with promotion versions of promotion instances associated with the promotion code.

In some implementations regarding the inferred response, if no response codes are known with the response, then a unique treatment instance or even multiple possible treatment instances are not immediately identified. Inferred response cases can represent instances of "viral marketing" where the marketing campaign did not target the customer but, for example, through word of mouth, the customer learned of the promotion and took the desired behavior. In such cases, the user relies on other data fields in the action table to infer multiple possible treatment instances. For example, the response would likely contain information regarding the product or custom promotion attributes associated with the promotion. Using the information known from the response, the user can infer that one or more treatment instances were responsible for eliciting the desired behavior and can therefore be credited.

Figure 21A:
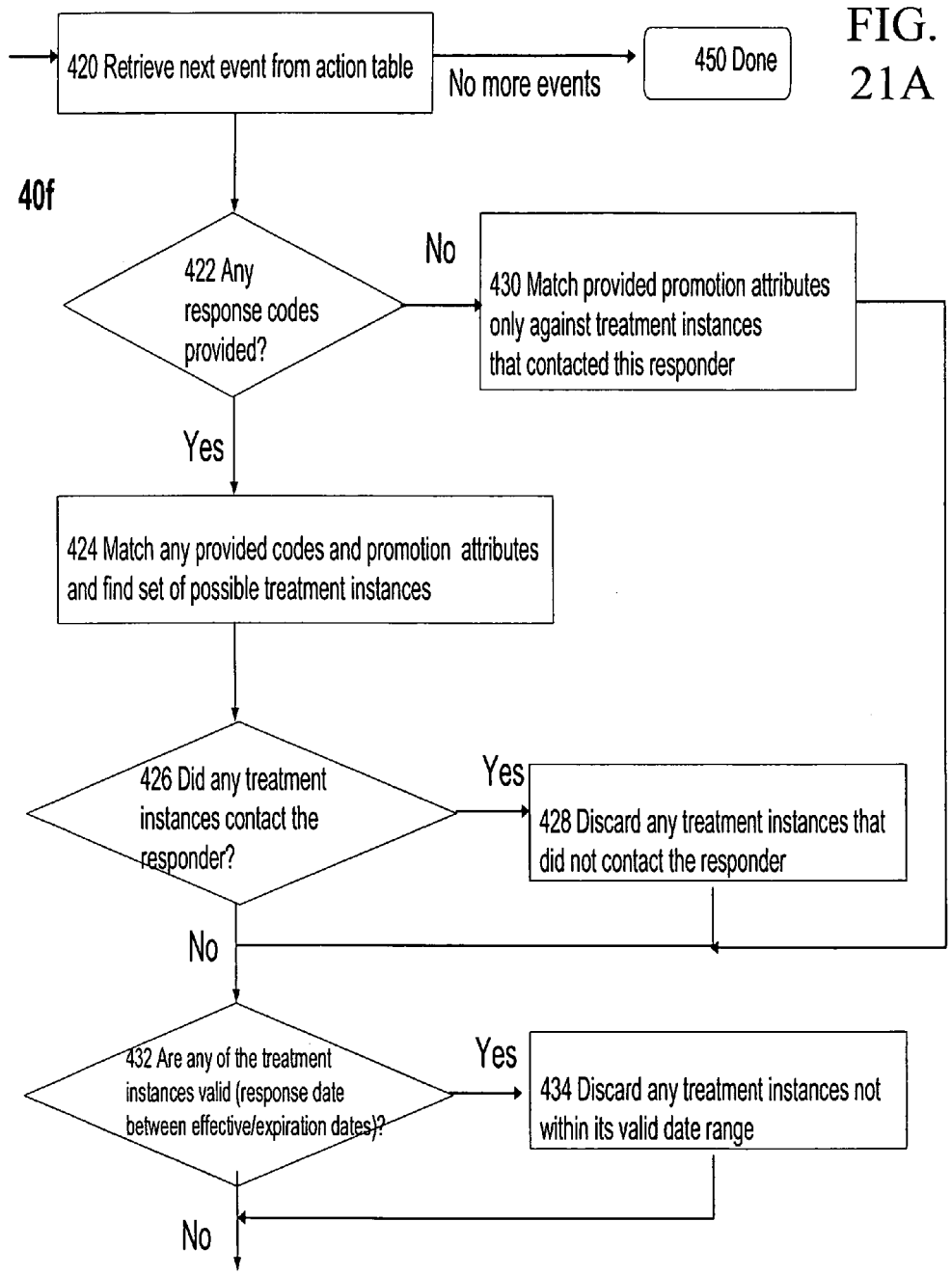
FIG. 21A to 21C are flowcharts depicting the steps in tracking direct and inferred responses and the inferred responses for control groups.
Figure 21B:
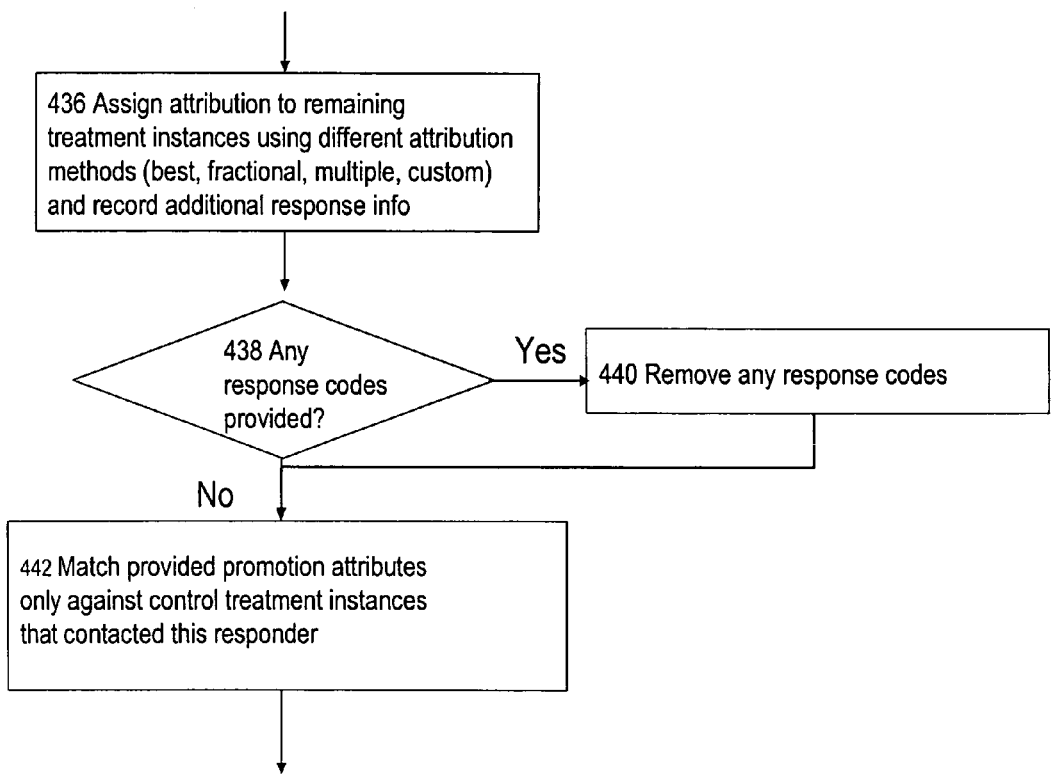
Figure 21C:
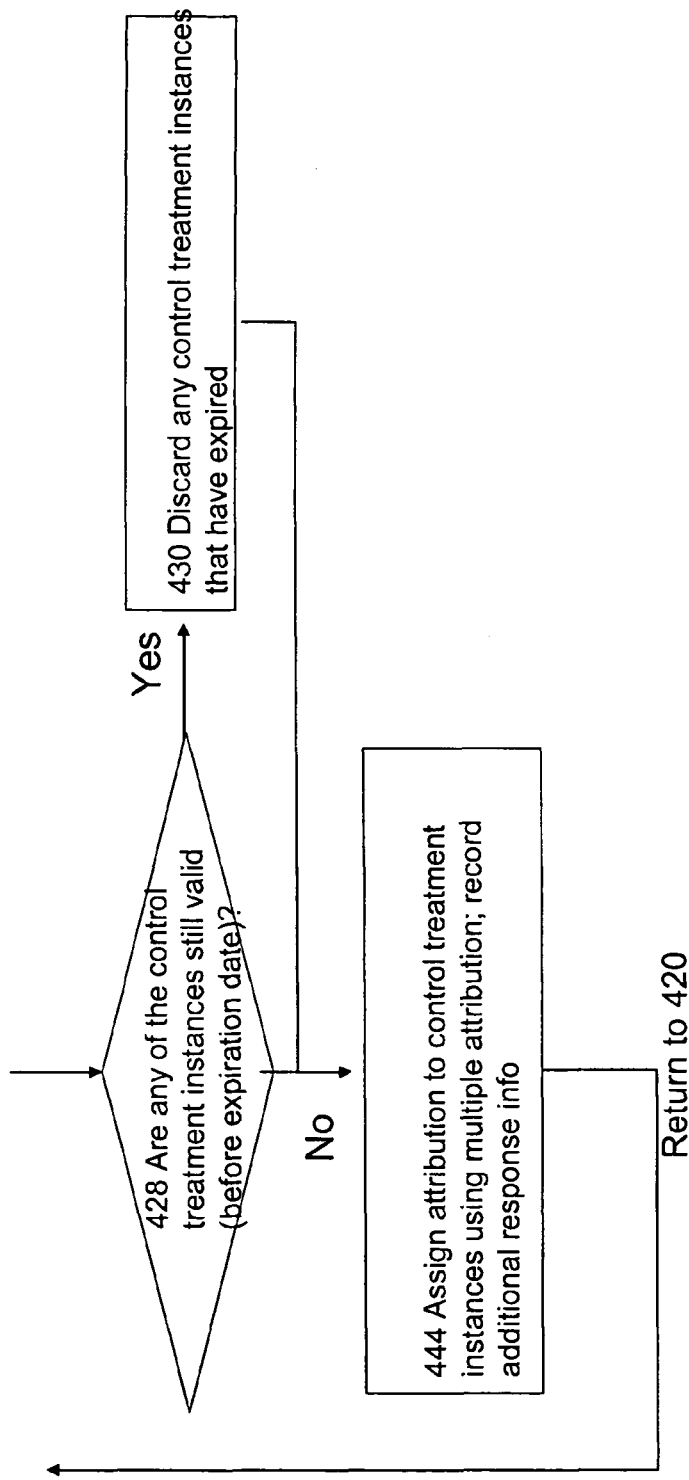

Referring to FIGS. 21A to 21C, the response tracking process 40f retrieves and processes one row (event) at a time from the action table, until all rows have been processed 450 (though described here conceptually as processing a single row at a time, response processing is not limited to a single row at a time as all rows can be processed simultaneously in a batch process). If one or more response codes have been provided 422 (direct response), then any non-NULL codes and promotion attributes are used to match against treatment instances to find the set of possible treatment instances to receive credit for this response event 424. From the set of possible treatment instances, if any treatment instance contacted the responder 426, then all treatment instances that did not contact the responder are discarded 428. If no response codes are provided in the event 422 (inferred response), then the provided promotion attributes are matched against only treatment instances that contacted the responder 430.

From the set of possible treatment instances, if the response date is between the effective and expiration dates of any treatment instances 432, then discard any treatment instances in which the response was not within the valid date range 434. For the remaining treatment instances, record all the appropriate response tracking information using multiple, simultaneous attribution methods.

Attributing responses to one or more treatment instances 436 includes distributing the credit among the one or more remaining treatment instances according to a set of rules. The rules include best match, fractional attribution, multiple attribution and custom attribution. In addition, response attributes are recorded identifying whether the responder was within the originally contacted target group or not, and whether the response date was within the valid promotion effective and expiration dates. Data also is captured to allow the user to count the number of total responders and/or the number of unique responders. Additionally, the marketing user can choose to track other responder state information (e.g., the response channel or the current credit card balance after a purchase stimulation campaign) as additionally tracked fields.

Once the attribution methods and response attributes have been captured, the user can choose to view any combination of attribution method(s)/attribute(s) for any response type(s) in performance reports. For example, one report could show different columns for 1) the number of unique individuals that were originally contacted that purchased (purchase is an example of a response type) prior the expiration date, 2) the total number of responses by individuals that were originally contacted that purchased prior the expiration date, and 3) the total number of purchases by individuals due to pass-alongs (not originally contacted) that purchased prior to the expiration date, and 4) the total number of purchases by individuals (originally contacted or not) after the expiration date.

"Best match" attribution credits a single treatment instance for the response. In the simplest case where the response is a direct exact type response, best match directly credits the treatment instance identified by the response tracking process to be the one treatment instance responsible for the desired behavior. In other cases, for example where the response is a direct inexact type response or an inferred type response which can be attributed to multiple treatment instances, best match will break the tie and credit a single treatment instance based on some configurable criteria (e.g., the treatment instance that promoted to the customer most recently). All other treatment instances receive zero credit under the best match attribution method. For example, if the same promotion is sent to the same individual multiple times over a period of time producing multiple treatment instances, without the means to discern from among the competing treatment instances, best match will credit the treatment instance last sent to the individual. If multiple treatment instances tie based on the specified criteria (e.g., multiple treatment instances were sent on the same latest date for "most recent"), then best match randomly credits any one of the tied treatment instances.

"Fractional attribution" credits one or more treatment instances an equal fraction for the response. Again, in the simplest case where the response is a direct exact type response, fractional attribution directly credits the treatment instance designated by the response tracking process to be the one treatment instance responsible for the desired behavior. Since the direct exact case identifies only one treatment instance, the treatment instance is assigned 1/1 credit. In other cases, again for example where the response is a direct inexact type response or an inferred type response which can be attributed to N treatment instances, fractional attribution will assign each of the N treatment instances 1/N credit (e.g., if there are three treatment instances to receive credit for fractional match, each will receive ⅓ or 0.3333 credit).

"Multiple attribution" assigns multiple treatment instances full credit for the response. For example, where the response is a direct inexact type response or an inferred type response which can be attributed to N treatment instances, multiple attribution will assign each of the N treatment instances full credit (1.0).

"Custom attribution" distributes credit to multiple treatment instances based on a user-defined scheme. Given the set of matching treatment instances and relevant information (e.g., the contact date for each treatment instance, the purchased product, etc.), the custom attribution scheme returns a numeric value representing the credit for each treatment instance. For example, custom attribution can be based on a mathematical formula that credits multiple treatment instances based on exponentially decaying weights assigned from "most recent" to "least recent." Or given a product hierarchy, a purchased product closest to the promoted product can be given greater credit than a treatment instance where the purchase is less related (e.g., purchasing a TV could credit a promotion targeting TVs more than a promotion targeting electronics in general, or a promotion targeting any product). It is evident that an infinite number of custom attribution possibilities are possible.

The response tracking process also can handle different levels of response based on known hierarchies in various dimensions (e.g., customer or product), where each category rolls up fully into a single parent (many-to-one relationships). If the product hierarchy is known and described to the system (e.g., a Panasonic™ DVD player model X belongs to Panasonic™ DVD players which belongs to DVD players, which belongs to Video, which belongs to Electronics, etc.), then a promotion instance promoting the specific model X can trigger different response levels, depending on the actual product purchased. The marketing user can report on the number of responders that purchased exactly model X; the number of responders that did not purchase model X, but purchased a Panasonic™ DVD player; the number of responders that did not purchase a Panasonic™ DVD player, but purchased a DVD player, and so on. Similarly, when a specific individual in a household is targeted, the marketing user wants to know how many times the targeted individual responded vs. how many times another member of the same household responded. In business-to-business scenarios, the customer dimension hierarchy can be significantly more complex (individual, group, department, division, company, etc.).

The response tracking process 40f also tracks control group responses, which are always inferred responses (as the recipients were given no codes to return). As discussed above, hold-out control groups or control groups allow the user to gauge the effectiveness of marketing campaigns targeting actual contact entities. Control groups gauge whether entities of a control group perform the desired behavior (e.g., inquire, activate, purchase) on a desired product (e.g., money-market account, plasma television, Boston-Los Angeles flight) without having been promoted the product/service. In this regard, response tracking for control groups is similar to response tracking for inferred responses, as control group response tracking is performed only of the promotion attributes, and response codes are ignored, if any. That is, the response codes reported with the response correspond to treatment instances of promotion version actually promoted to contacts and do not correspond to treatment instances of the control group.

After attributing response to treatment instances 436, if any response codes were provided 438, those response codes are removed 440. Control treatment instances containing the responder (i.e., where the responder was in the control group) are identified by matching promotion attributes 442. If the response date is between the effective and expiration dates of any control treatment instances 444, then discard any control treatment instances in which the response was not within the valid date range 446. The identified treatment instances of the control groups can then be credited and the appropriate response attributes recorded 448. Control group response tracking can be accomplished with, but is not limited to, multiple attribution. After control treatment instances have been credited, the response tracking process 40f returns to process the next event in the action table 420.

In addition to direct and inferred responses, the response tracking process can also track personalized promotions through data-driven parameterization and its associated controls. As described above, data-driven promotion personalization refers to the case where contact entities of a single target group receive promotion versions based on parameterized promotion attributes with values populated from a list or table containing personalized data for each of the contact entities. For the data in personalized case to be meaningful for analysis, the response reports information pertaining specifically to the data-driven parameterized promotion attributes. The detailed contact history table records the exact promotion version(s) received by each member of the target group (or the offer versions a member of the control group would have received). The response tracking process 40$f$ is then the same as previously described, except that for each treatment in the treatment history table 256 (FIG. 15), a flag identifies whether corresponding contact history data resides in the contact history table 258 or the detailed contact history table (not shown in FIG. 15).

In FIG. 20, the action table can be used to produce one or more response tables 414 with rows to log the response attribution data and the response attributes data. A response table is (conceptually) produced for each audience level. Therefore, for example, there can be a response table for the household audience as identified by the householdID, one for the customer level as identified by the custID, and one for the account level as identified by the accountID (note that these could be same underlying physical table if desired). The response table permits the user to review the data from the marketing campaign to assess campaign performance based on, for example, return on investment or any other economic, business, or investment model. To assist the user in this regard, the response tracking process can produce varied response tracking reports. As examples, reports can include detailed response type information. Reports can be generated according to time, group, campaign, channel, promotion instance, or promotion version attributes. Reports can be group-based (i.e., reporting the number of responses in view of the number of groups in a campaign or any group-level custom attribute) or promotion-based (i.e., reporting based on the different promotions within a campaign or any promotion custom attribute). Reports can also show the effectiveness of a given promotion by the number of targeted responders in view of the number of viral (non-targeted) responders. Reports can also show control group data and can calculate lift over the control group. Reports can be configured to display unique vs. duplicate counts. In some implementations, reports include data from any combination of the above.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation of embodiments, or any combination of such back end, middleware, or front end components. The components of the system can be interconnected by any form or medium of digital data communication, e.g., a communication network. Examples of communication networks include a local area network (LAN) and a wide area network (WAN), e.g., the Internet.

The system and method may use the "World Wide Web" (Web or WWW), which is that collection of servers on the Internet that utilize the Hypertext Transfer Protocol (HTTP). HTTP is a known application protocol that provides users access to resources, which may be information in different formats such as text, graphics, images, sound, video, Hypertext Markup Language (HTML), as well as programs. Upon specification of a link by the user, the client computer makes a TCP/IP request to a Web server and receives information, which may be another Web page that is formatted according to HTML. Users can also access other pages on the same or other servers by following instructions on the screen, entering certain data, or clicking on selected icons. It should also be noted that any type of selection device known to those skilled in the art, such as check boxes, drop-down boxes, and the like, may be used for embodiments using web pages to allow a user to select options for a given component. Servers run on a variety of platforms, including UNIX machines, although other platforms, such as Windows 2000/2003, Windows NT, Sun, Linux, and Macintosh may also be used. Computer users can view information available on servers or networks on the Web through the use of browsing software, such as Netscape Navigator, Microsoft Internet Explorer, Mosaic, or Lynx browsers. The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the application. Other embodiments are within the scope of the following claims.

What is claimed is:

1. A computer implemented method for executing marketing campaign software to manage a target group of contacts, the method comprises:

producing by a computer, a table, the table including one or more contact group entries corresponding to one or more defined contact group entities with each of the entries having a first set of group attributes;

generating by the computer, a marketing campaign from executing the marketing campaign software;

producing by the computer, a visual representation of the marketing campaign resulting from execution of the market campaign software, the representation including one or more instances of defined contact group entities, with the one or more instances having a second set of group attributes and with the representation of the marketing campaign linked to the table according to the second set of group attributes; and generating a graphical user interface with the graphical user interface when displayed on a display device rendering the visual representation of the marketing campaign.

2. The method of claim 1 wherein the second set of group attributes correspond to the first set of group attributes, and with the table and the flowchart representing promotions assigned to contact group entities in a marketing campaign.

3. The method of claim 1 wherein the one or more first group attributes comprise:
a group name and a group code corresponding to a group of contact entities.

4. The method of claim 1 wherein the one or more first group attributes comprise one or more group-level custom attributes, the one or more group-level custom attributes corresponding to metadata associated with the group.

5. The method of claim 2 wherein the group code is a first group code and each of the one or more flowchart instances comprise a second group code corresponding to a first group code of one or more group spreadsheet records.

6. The method of claim 1 wherein the table is produced as a spreadsheet and the visual representation of the marketing campaign is rendered as a flowchart.

7. The method of claim 6 wherein the method further comprises:
updating the one or more first group attributes of one or more of the group spreadsheet records; and
mirroring the updating in the one or more second group attributes of the one or more flowchart instances corresponding to the one or more first group attributes of the one or more group spreadsheet records.

8. The method of claim 6 wherein the method further comprises:
updating the one or more second group attributes of one or more of the flowchart instances; and
mirroring the updating in the one or more first group attributes of the one or more group spreadsheet records corresponding to the one or more second group attributes of the one or more flowchart instances.

9. The method of claim 6 wherein producing the group spreadsheet comprises:
linking one or more group spreadsheet records with one or more flowchart instances; and
populating the first group attributes of the one or more group spreadsheet records from the second group attributes of the one or more flowchart instances.

10. The method of claim 6 wherein producing the campaign flowchart comprises:
linking one or more flowchart instances with one or more group spreadsheet records; and
populating the second group attributes of the one or more flowchart instances from the first group attributes of the one or more group spreadsheet records.

11. The method of claim 3 wherein the promotion instance comprises parameterized attributes and the method further comprises:
using the first group attributes for data-driven personalization of the parameterized attributes.

12. The method of claim 1 wherein the one or more first group attributes comprise:
a control group name corresponding to a control group assigned to the group; and
a promotion instance name corresponding to a promotion instance assigned to the group.

13. The method of claim 1 further comprises:
using the first group attributes to define the one or more instances.

14. A computer program product tangibly embodied on a computer readable medium for producing a representation of a marketing campaign resulting from execution of marketing campaign software to manage a target group of contacts, comprises instructions for causing a computer to:
produce a table, the table including one or more contact group entries corresponding to one or more defined contact group entities with each of the entries having a first set of group attributes;
generate a marketing campaign from executing the marketing campaign software;
produce a visual representation of the marketing campaign resulting from execution of marketing campaign software, the representation including one or more instances of defined contact group entities, with the one or more instances having a second set of group attributes and with the representation of the marketing campaign linked to the table according to the second set of group attributes; and
generate a graphical user interface with the graphical user interface when displayed on a display device, rendering the visual representation of the marketing campaign.

15. The computer program product of claim 14 wherein the second set of group attributes correspond to the first set of group attributes, and with the table and the flowchart representing promotions assigned to contact group entities in a marketing campaign.

16. The computer program product of claim 14 wherein the one or more first group attributes comprise:
a group name and a group code corresponding to a group of contact entities.

17. The computer program product of claim 14 wherein the one or more first group attributes comprise one or more group-level custom attributes, the one or more group-level custom attributes corresponding to metadata associated with the group.

18. The computer program product of claim 15 wherein the group code is a first group code and each of the one or more flowchart instances comprise a second group code corresponding to a first group code of one or more group spreadsheet records.

19. The computer program product of claim 14 wherein the table is produced as a spreadsheet and the visual representation of the marketing campaign is rendered as a flowchart.

20. The computer program product of claim 19 further comprises instruction for causing a computer to:
update the one or more first group attributes of one or more of the group spreadsheet records; and
mirror the updating in the one or more second group attributes of the one or more flowchart instances corresponding to the one or more first group attributes of the one or more group spreadsheet records.

21. The computer program product of claim 19 further comprises instruction for causing a computer to:
update the one or more second group attributes of one or more of the flowchart instances; and
mirror the updating in the one or more first group attributes of the one or More group spreadsheet records corresponding to the one or more second group attributes of the one or more flowchart instances.

22. The computer program product of claim 19 wherein instructions that produce the group spreadsheet further comprise instructions for causing a computer to:
    link one or more group spreadsheet records with one or more flowchart instances; and
    populate the first group attributes of the one or more group spreadsheet records from the second group attributes of the one or more flowchart instances.

23. The computer program product of claim 19 wherein instructions that produce the group spreadsheet further comprise instructions for causing a computer to:
    link one or more flowchart instances with one or more group spreadsheet records; and
    populate the second group attributes of the one or more flowchart instances from the first group attributes of the one or more group spreadsheet records.

24. The computer program product of claim 19 wherein the promotion instance comprises parameterized attributes and further comprises instructions for causing a computer to:
    use the first group attributes for data-driven personalization of the parameterized attributes.

25. The computer program product of claim 14 wherein the one or more first group attributes comprise:
    a control group name corresponding to a control group assigned to the group; and
    a promotion instance name corresponding to a promotion instance assigned to the group.

26. The computer program product of claim 14 further comprises instructions for causing a computer to:
    use the first group attributes to define the one or more instances.

27. An apparatus comprises:
    a processor;
    memory executing marketing campaign software for management of a target group of contacts, the marketing campaign software comprising instructions for causing a computer to:
    produce a table in memory, the table including one or more contact group entries corresponding to one or more defined contact group entities with each of the entries having a first set of group attributes;
    generate a marketing campaign from executing the marketing campaign software:
    produce a visual representation of the marketing campaign resulting from execution of marketing campaign software, the representation including one or more instances of defined contact group entities, with the one or more instances having a second set of group attributes and with the representation of the marketing campaign linked to the table according to the second set of group attributes; and
    generate a graphical user interface with the graphical user interface when displayed on a display device rendering the visual representation of the marketing campaign.

28. The apparatus of claim 27 wherein the one or more first group attributes comprise:
    a group name and a group code corresponding to a group of contact entities.

29. The apparatus of claim 27 wherein the one or more first group attributes comprise one or more group-level custom attributes, the one or more group-level custom attributes corresponding to metadata associated with the group.

30. The apparatus of claim 28 wherein the group code is a first group code and each of the one or more flowchart instances comprise a second group code corresponding to a first group code of one or more group spreadsheet records.

31. The apparatus of claim 27 wherein the table is produced as a spreadsheet and the visual representation of the marketing campaign is rendered as a flowchart.

32. The apparatus of claim 31 further comprising instructions for causing a computer to:
    update the one or more first group attributes of one or more of the group spreadsheet records; and
    mirror the updating in the one or more second group attributes of the one or more flowchart instances corresponding to the one or more first group attributes of the one or more group spreadsheet records.

33. The apparatus of claim 28 further comprising instructions for causing a computer to:
    update the one or more second group attributes of one or more of the flowchart instances; and
    mirror the updating in the one or more first group attributes of the one or more group spreadsheet records corresponding to the one or more second group attributes of the one or more flowchart instances.

34. The apparatus of claim 28 further comprising instructions for causing a computer to:
    link one or more group spreadsheet records with one or more flowchart instances; and
    populate the first group attributes of the one or more group spreadsheet records from the second group attributes of the one or more flowchart instances.

* * * * *